US006967304B2

(12) United States Patent
Gevelber et al.

(10) Patent No.: US 6,967,304 B2
(45) Date of Patent: Nov. 22, 2005

(54) FEEDBACK ENHANCED PLASMA SPRAY TOOL

(75) Inventors: Michael Alan Gevelber, Newton, MA (US); Donald Edward Wroblewski, Wellesley, MA (US); James Russell Fincke, Los Alamos, NM (US); William David Swank, Idaho Falls, ID (US); Delon C. Haggard, Idaho Falls, ID (US); Randy Lee Bewley, Blackfoot, ID (US)

(73) Assignee: Cyber Materials LLC, Auburndale, MA (US)

( * ) Notice: Subject to any disclaimer, the term of this patent is extended or adjusted under 35 U.S.C. 154(b) by 41 days.

(21) Appl. No.: 10/423,237

(22) Filed: Apr. 26, 2003

(65) Prior Publication Data

US 2004/0031776 A1 Feb. 19, 2004

Related U.S. Application Data

(60) Provisional application No. 60/376,135, filed on Apr. 29, 2002.

(51) Int. Cl.$^7$ ................................................ B23K 9/00
(52) U.S. Cl. .......................... 219/121.47; 219/121.55
(58) Field of Search ....................... 219/121.11, 121.36, 219/121.47, 121.48, 121.5, 121.51, 121.54, 121.55, 121.59, 79.16; 427/448; 250/227.11, 554; 239/69, 79

(56) References Cited

U.S. PATENT DOCUMENTS

| | | | |
|---|---|---|---|
| 5,047,612 A | * | 9/1991 | Savkar et al. ........... 219/121.47 |
| 5,180,921 A | * | 1/1993 | Moreau et al. ......... 219/121.47 |
| 5,744,777 A | * | 4/1998 | Bernecki et al. ....... 219/121.47 |
| 6,390,383 B1 | * | 5/2002 | Fusaro et al. ................. 239/69 |

OTHER PUBLICATIONS

Michael A. Gevelber, "Process Control," Wiley Encyclopedia of Electrical and Electronics Engineering, 1999, John Wiley & Sons, Inc.

Y. C. Lau, et al, "Inelligent Processing of Materials for Thermal Barrier Coatings," TBC Workshop, 1997, NASA Lewis Research Center, Clevelan, OH.

J. R. Fincke, et al, "Feedback Control of the Subsonic Plasma Spray Process: System Model," Proc. of 8th National Thermal Spray Conference, 11–15 Sep, 1995, Houston TX.

P. Gougeon and C. Moreau, "In–Flight Particle Surface Temp. Measurement: Influence of the Plasma Light Scattered by the Particles,"J. of Thermal spray Tech, v2(3) Sep. 93, p.229.

J.F. Blisson, et al, "Ensemble In–Flight Particle Diagnostics under Thermal Spray Conditions," Thermal Spray 2001: New Surfaces for New Mil. ASM Int'l, Materials Park., OH 2001.

(Continued)

Primary Examiner—Tu Hoang
(74) Attorney, Agent, or Firm—James Marc Leas

(57) ABSTRACT

An improved automatic feedback control scheme enhances plasma spraying of powdered material through reduction of process variability and providing better ability to engineer coating structure. The present inventors discovered that controlling centroid position of the spatial distribution along with other output parameters, such as particle temperature, particle velocity, and molten mass flux rate, vastly increases control over the sprayed coating structure, including vertical and horizontal cracks, voids, and porosity. It also allows improved control over graded layers or compositionally varying layers of material, reduces variations, including variation in coating thickness, and allows increasing deposition rate. Various measurement and system control schemes are provided.

60 Claims, 24 Drawing Sheets

OTHER PUBLICATIONS

P. Nylen, et al, "On–line Microstructure and Property Control of a Thermal Sprayed Abrasive Coating," Thermal Spray 2001: New Surfaces for New Mil. ASM Int'l , Mat. Park, 2001.

C.J. Friedrich, et al, "IR Thermographic Imaging–a Powerful Tool for On–Line Process Control..." Thermal Spray 2001: New Surfaces for New Mil. ASM Int'; , Mat. Park, OH 2001.

Michel Vardelle, et al, "Plasma spray processes: diagnostics and control?" Pure Appl. Chem., vol. 71, No. 10, pp. 1909–1916, 1999.

T. REnault, et al, "On–Line Control of Particle Spray Jet and Residual Stresses in Plasma Sprays," 1st Int'l Thermal Spray Conf. 2000.

J.R. Fincke, et al, "The Influence of Injector Geometry and Carrier Gas Flow Rate on Spray Pattern," Proc. of the United Thermal Spray Conf, 1997, Indianapolis, IN, ASM Intl.

J.R Fincke, et al, "Diagnostics and control in the thermal spray process," Surface and Coatings Technology 146–147 (2001) 537–543.

M. Gevelber, et al, "System Characterization and Plasma–Particle Distribution Anal..." Proc. of IMECE 2000, Intl, Mech Eng. Conf and Exposition, Nov. 5–10, 2000, Orlando.

S. Sampath and H. Herman, "Rapid Solidfication and Microstructure Development during Plasma Spray Deposition," J. of Thermal Spray Tech, V. 5(4) Dec. 1996–445.

* cited by examiner

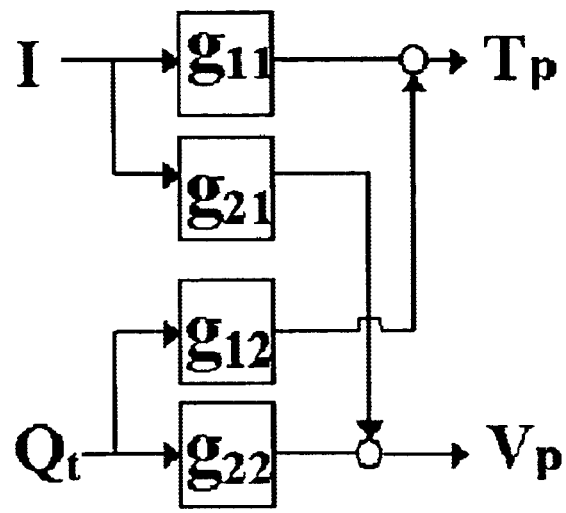
*FIG. 6: Prior Art.*
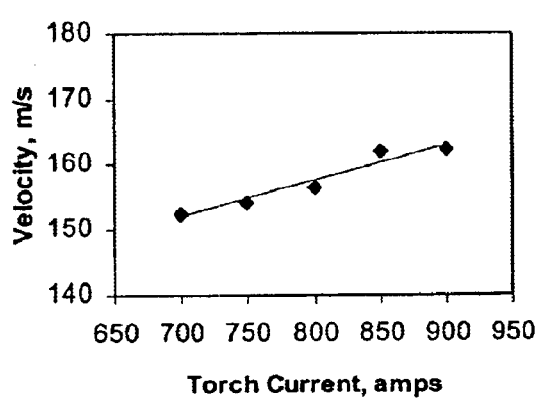
*FIG. 7a: Prior Art.*
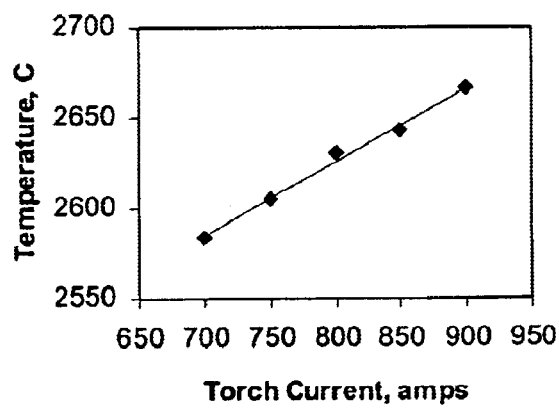
*FIG. 7b Prior Art.*

$$G = \begin{array}{c|ccc} & I & Q_t & Q_c \\ \hline T_p & 0.40 & -2.20 & -25.5 \\ V_p & 0.055 & 1.44 & -4.88 \\ y_{cent} & 0.0015 & -0.15 & 1.94 \end{array} \qquad (1)$$

$$\text{Scaled } G = \begin{array}{c|ccc} & I & Q_t & Q_c \\ \hline T_p & 0.800 & -0.405 & -0.51 \\ V_p & 0.458 & 1.10 & -0.407 \\ y_{cent} & 0.150 & -1.38 & 1.94 \end{array} \qquad (2)$$

Condition number: $\kappa_2(\widetilde{G}) = 3.33$ where $\kappa_2(\widetilde{G}) = \overline{\sigma}(\widetilde{G}) / \underline{\sigma}(\widetilde{G})$; (3)

$\overline{\sigma}(\widetilde{G}) = 2.587$ and $\underline{\sigma}(\widetilde{G}) = 0.775$ $$\text{Relative Gain Array } \Lambda = [\lambda_{ij}] = \begin{array}{c|ccc} & I & Q_t & Q_c \\ \hline T_p & 0.615 & 0.187 & 0.198 \\ V_p & 0.332 & 0.874 & -0.206 \\ y_{cent} & 0.053 & -0.061 & 1.008 \end{array} \qquad (4)$$

Where $\lambda_{ij} = \widetilde{G}_{ij} H_{ij}$, and $H = (\widetilde{G}^{-1})^T$ (5)

*FIG. 7d*

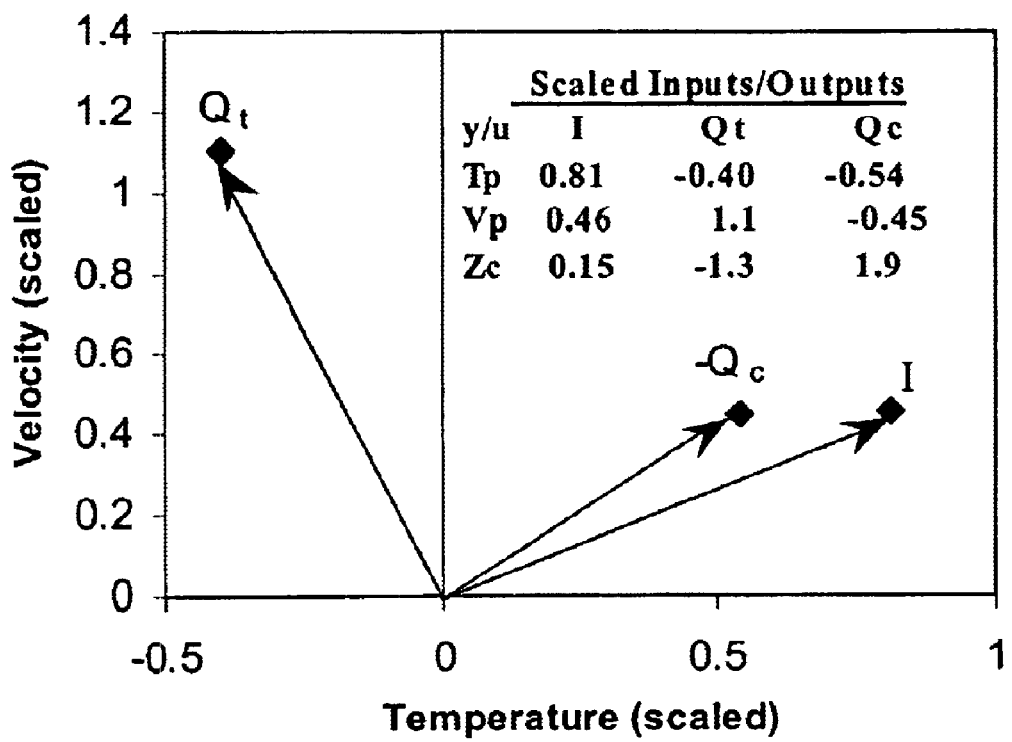
*FIG. 8: Prior Art.*
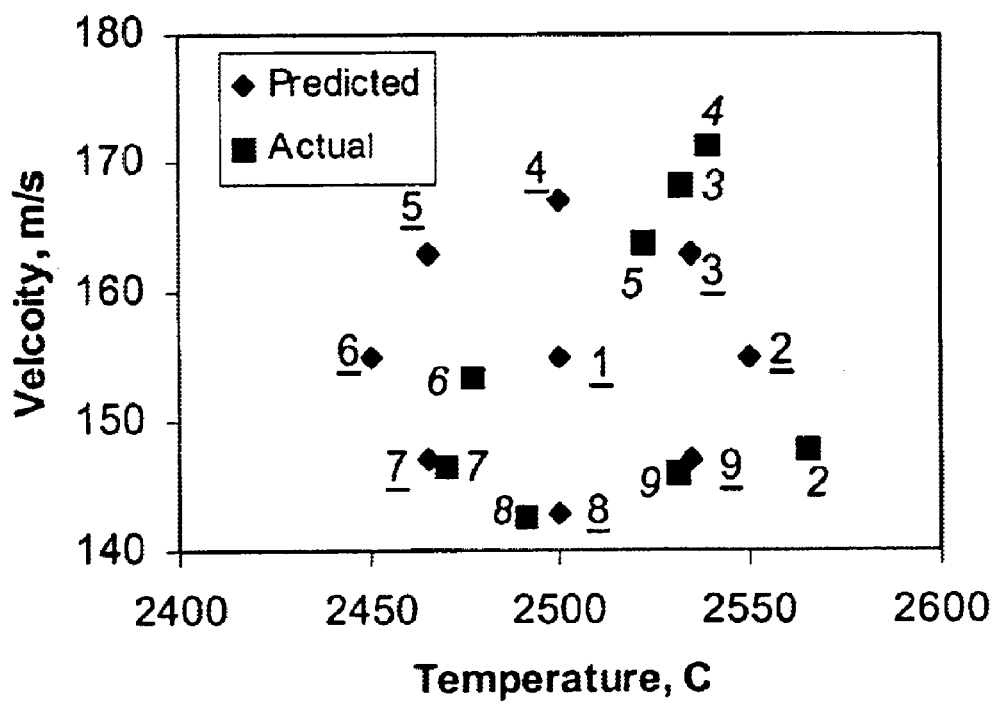
*FIG. 9: Prior Art.*

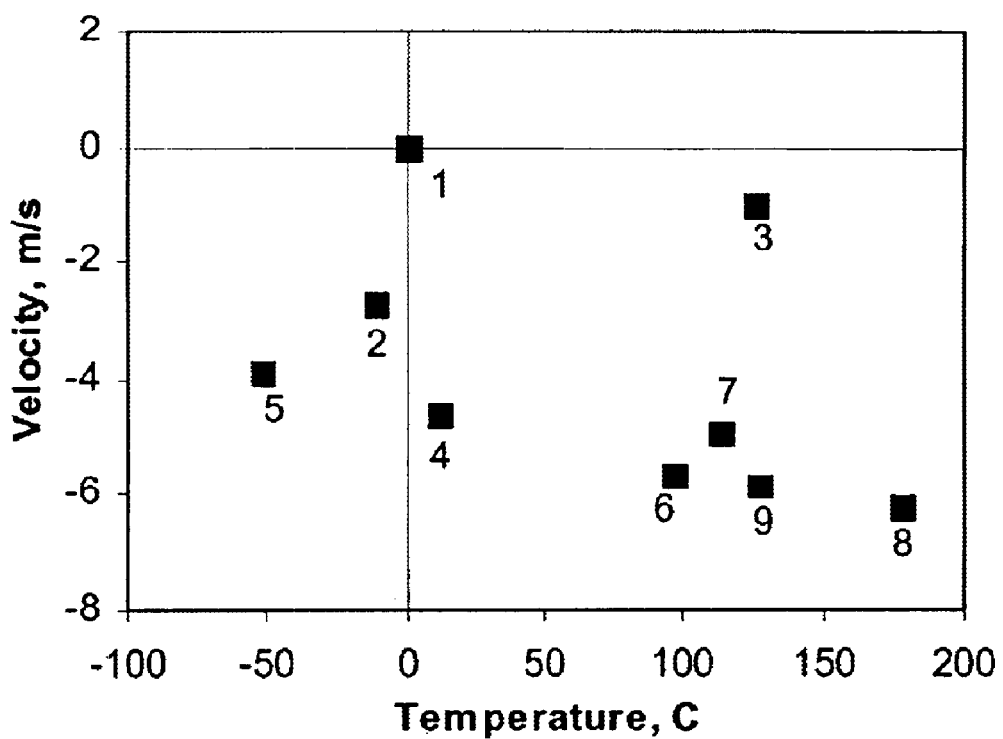
*FIG. 10: Prior Art.*
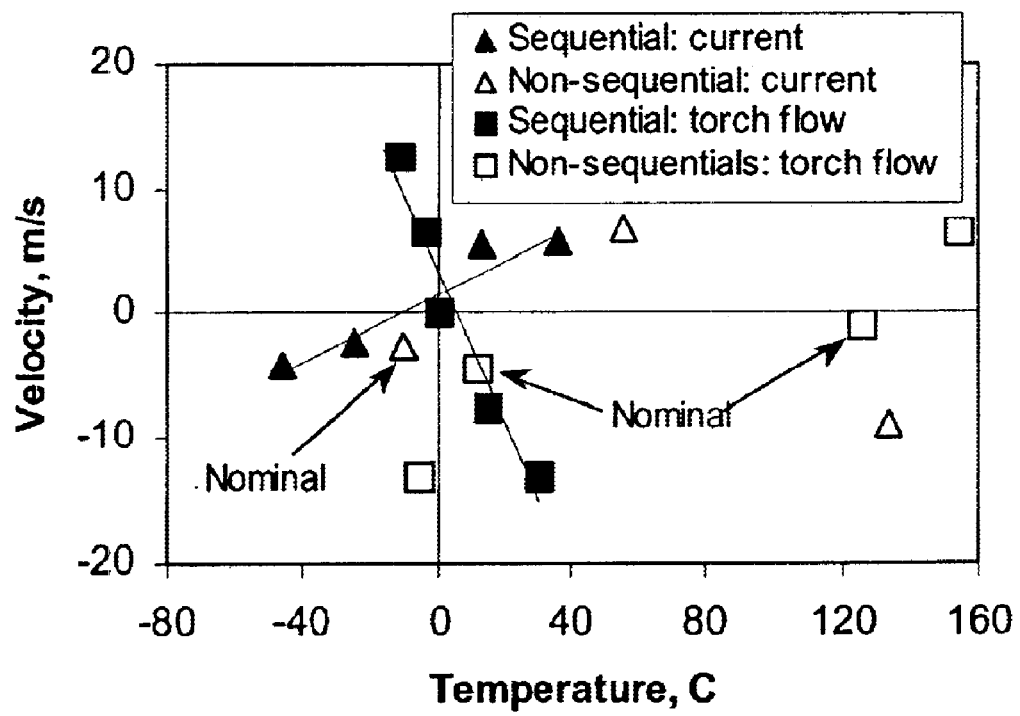
*FIG. 11: Prior Art.*

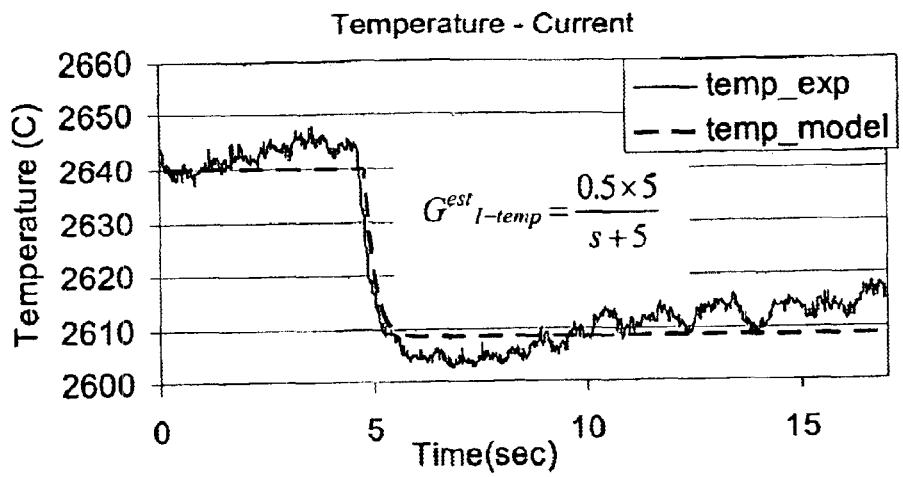
FIG. 14a
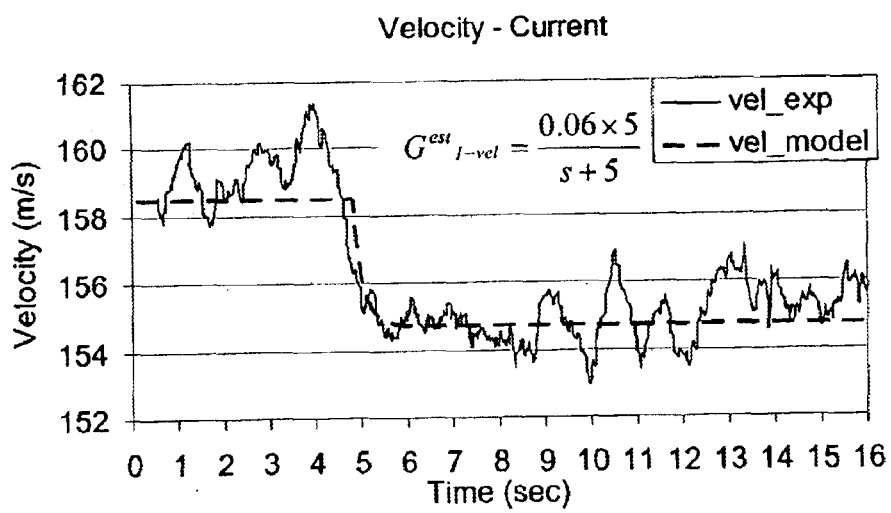
FIG. 14b
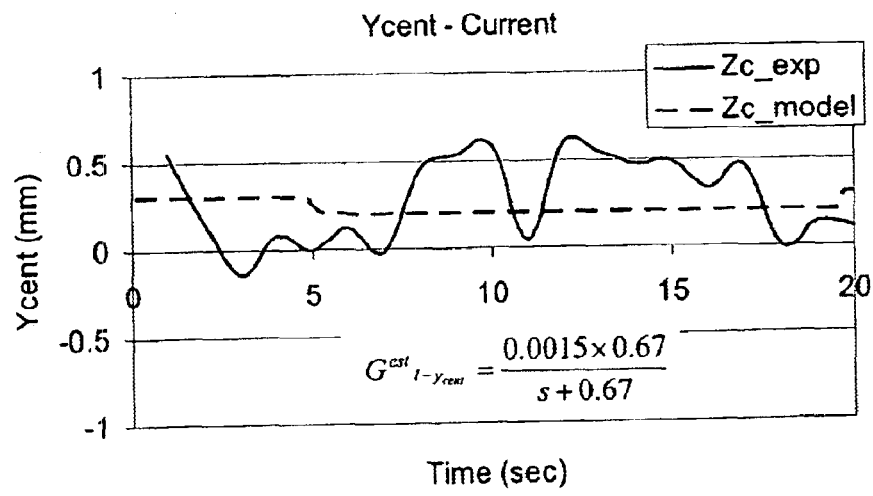
FIG. 14c
FIG. 14

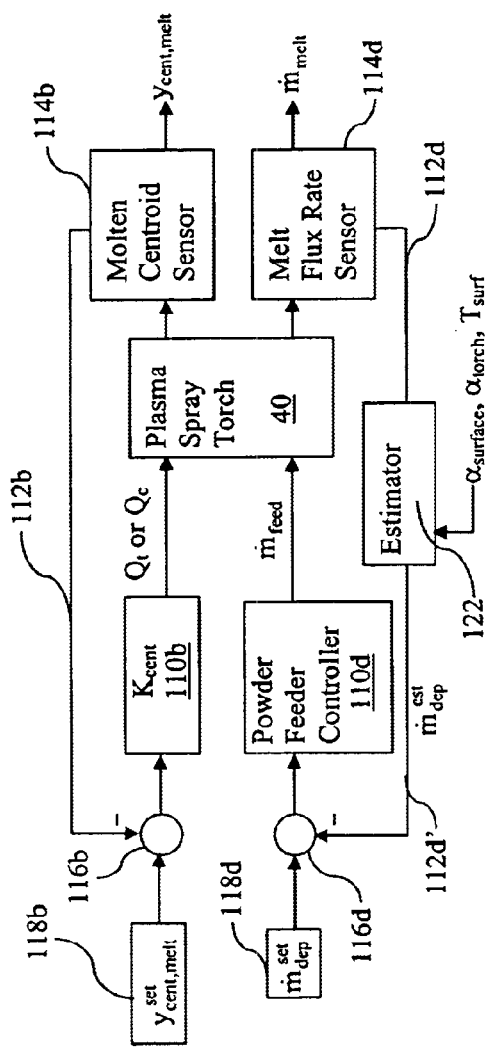
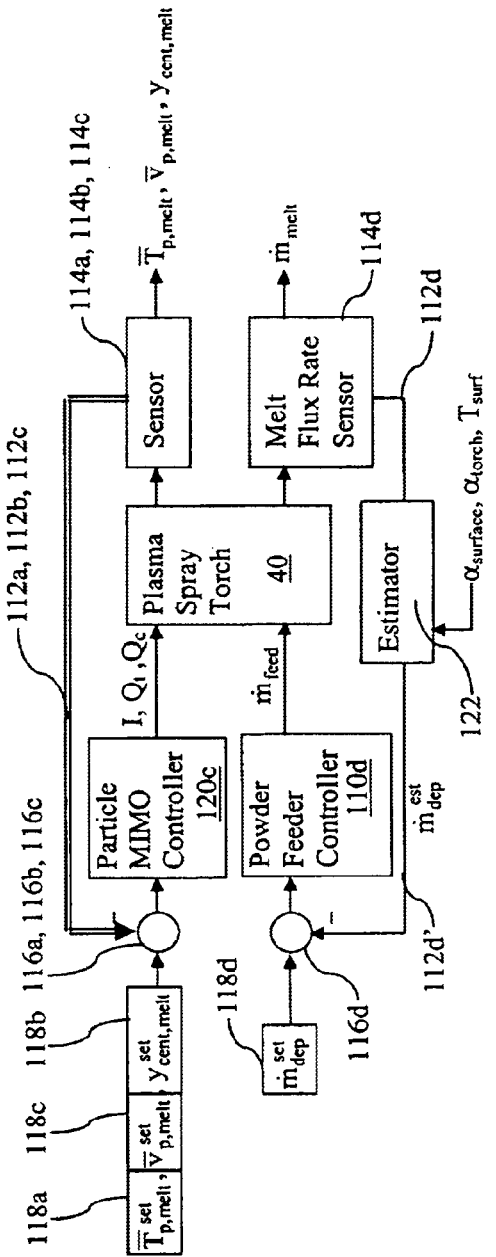
FIG. 21a
FIG. 21b

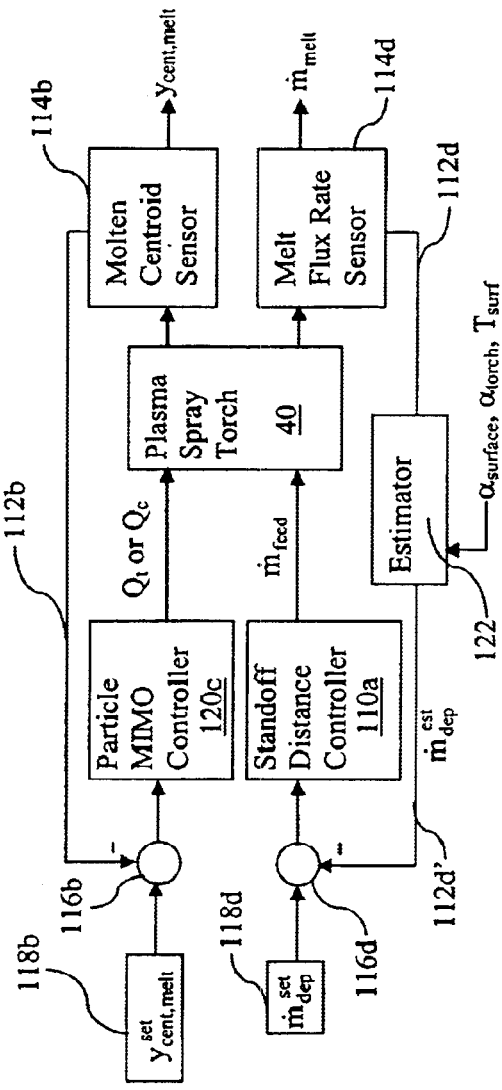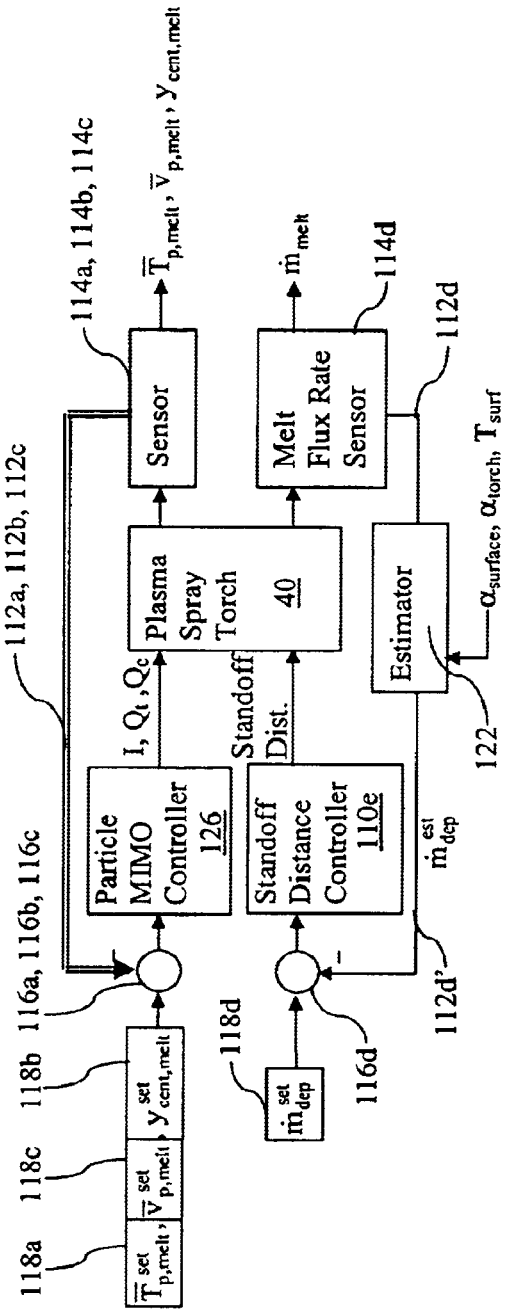
FIG. 23a
FIG. 23b

FEEDBACK ENHANCED PLASMA SPRAY TOOL

RELATED APPLICATIONS

This application claims priority of provisional application No. 60/376,135 filed Apr. 29, 2002, incorporated herein by reference.

This invention was made with Government support under contract number DMI-9713957 awarded by the National Science Foundation. The Government has certain rights in the invention. The United States Government also has certain rights in this invention pursuant to Contract No. DE-AC07-99ID13727 between the United States Department of Energy and Bechtel BWXT Idaho, LLC.

FIELD OF THE INVENTION

This invention generally relates to a device for spraying a material. More particularly, it relates to a device for plasma spraying a powdered material. Even more particularly, it relates to a device that includes sensors and feedback for enhanced plasma spraying of the powdered material.

BACKGROUND OF THE INVENTION

Plasma spray is used in manufacturing operations in aerospace, energy, engine, electronic, and biomedical because it can economically produce engineered coatings that protect against wear, reduce friction, and reduce corrosion. The plasma spray coatings are also particularly suited to protect underlying metals against high temperature environments, such as in jet engines. Either ceramic or metallic coatings can be formed with plasma spray. However, up until now parts coated with plasma spray have varied substantially from each other. The industry has therefore not been able to reliably design parts with tightly specified engineered coating structures or to reproduceably provide a desired porosity, crack density, and grain structure. Nor has the industry been able to consistently provide sufficient control over sprayed layers so different materials could be provided with tightly specified properties and thicknesses or so layers with varying composition were deposited. Looser specifications than desired have been needed in production or a substantial fraction of coatings have had to be reworked. And no tool has been available that provides improved control over these coating parameters while providing a high deposition rate to reduce cost of sprayed layers.

One scheme to improve plasma spray process was disclosed in an article, "Feedback Control of the Subsonic Plasma Spray Process: Controller Performance," Fincke, J. R., et. al., Proceedings of the 8$^{th}$ National Thermal Spray Conference, September 1995 Houston, pp 117–122, in which the author demonstrated the ability to independently control both the particle velocity and the temperature of the particles coming from a plasma spray torch. In this article, particle temperature was measured and the measurement fed back to adjust torch current. The particle velocity measurement was fed back to adjust torch gas flow rate.

Another scheme to improve plasma spray process was disclosed in an article, "Intelligent Processing of Materials for Thermal Barrier Coatings," by Y. C. Lau, et al, TBC Workshop 1997, sponsored by the TBC Interagency coordination Committee, NASA Lewis Research Center, in which the authors provided an interaction matrix and coordinated manipulation of torch current and plasma gas flow inputs to control both temperature and velocity.

While both approaches improved control over plasma spray coatings, wide variation from part to part and even during the process of spraying a single part remained. Thus, a better system for controlling plasma spray is needed, and this solution is provided by the following invention.

SUMMARY OF THE INVENTION

It is therefore an object of the present invention to more tightly control coating parameters, such as thickness, porosity, crack density, and grain structure;

It is a further object of the present invention to provide for detecting and controlling spray pattern shape or spatial distribution of particles;

It is a further object of the present invention to provide a system that includes feedback of spatial distribution of particles or of a spatial parameter characteristic of the spatial distribution of particles;

It is a further object of the present invention to provide for feedback of temperature along with feedback of spatial distribution of particles or a spatial parameter characteristic of the spatial distribution of particles;

It is a further object of the present invention to provide for detecting and controlling such state attributes of particles as their temperature, velocity, and size along with spatial distribution of particles;

It is a further object of the present invention to provide for detecting and controlling flux rate of molten particles along with spatial distribution of particles;

It is a further object of the present invention to increase deposition rate while controlling the other variables;

It is a further object of the present invention to provide for control of multiple cross coupled process variables;

It is a feature of the present invention that process variables are adjusted based on data from a high density region of the particle spatial distribution or from a centroid of the distribution;

It is a further feature of the present invention to measure variables including spray pattern spatial distribution, temperature, or velocity and to adjust current, plasma gas flow rate, or carrier gas flow rate to control the spray pattern spatial distribution, temperature, or velocity;

It is a further feature of the present invention that the measured particle states ate averages or mass weighted averages taken across the spatial distribution of particles;

It is an advantage of the present invention that process variations caused by torch wear or aging can be detected and compensated by taking measurements and making adjustments throughout a deposition run;

It is a further advantage of the present invention that coating structure can be engineered to control density, horizontal cracks, vertical cracks, voids, and porosity at different depths of the coating;

It is a further advantage of the present invention that coating thickness can be more tightly controlled; and It is a further advantage of the present invention that coating deposition rate can be increased while maintaining control over other variables and while maintaining desired coating characteristics.

It is a further advantage of the present invention that it enables grading of coating composition as a function of coating thickness It is a further advantage of the present invention that it enables optimizing deposition efficiency It is a further advantage of the present invention that it enables setting a desired deposition rate and deposition efficiency.

It is a further advantage of the present invention that deposition rate can be maintained by adjusting the feedstock rate from feed sources including powders, liquids, suspensions of powders in liquids, or wire.

These and other objects, features, and advantages of the invention are accomplished by a method of depositing a material on a substrate. The method includes the steps of:
a) providing a plasma spray torch having electrodes;
b) providing a first gas into said plasma spray torch, said first gas having a first gas flow rate;
c) providing a controllable power supply for providing a current across said electrodes for generating a plasma in said first flow of gas;
d) providing particles of a material;
e) providing a second gas for carrying said particles and directing said second gas carrying said particles into said plasma;
f) heating said particles in said plasma and accelerating said particles from said spray torch with said first gas;
g) measuring a temperature of said sprayed particles;
h) measuring a spatial distribution of said particles or measuring a location characteristic of said spatial distribution of said particles; and
i) adjusting current from said controllable power supply and adjusting said first gas flow rate or said second gas flow rate to obtain a desired temperature of said sprayed particles and a desired spatial distribution or a desired location characteristic of said spatial distribution.

Another aspect of the invention is a system including a sensor, an automatic controller, an actuator, and an input variable. The sensor is for measuring a spatial distribution of particles or for detecting a spatial parameter characteristic of the spatial distribution of particles. The input variable is one that effects the spatial distribution of particles. The automatic controller is for receiving the spatial distribution or the spatial parameter data from the sensor and directing the actuator. The actuator is for adjusting the input variable as directed by the automatic controller based on the spatial data.

Another aspect of the invention is a system for depositing a material on a substrate, comprising a spray torch having electrodes. The system also includes a first gas for injecting into the spray torch, the first gas having a first gas flow rate. It also includes a controllable power supply for providing a current across the electrodes. It also includes a controllable device for injecting a material into a region adjacent the electrodes, wherein the material is heated in the region and particles of the material are accelerated from the spray torch with the first gas. It also includes a first sensor for measuring a temperature of the sprayed particles. It also includes a second sensor for measuring a spatial distribution of the sprayed particles or measuring a location characteristic of the spatial distribution of the sprayed particles. It also includes a current actuator for adjusting current from the controllable power supply. It also includes a first actuator for adjusting the first gas flow rate and a second actuator for adjusting the controllable device for injecting of the material. It also includes a controller to receive data from the first sensor and the second sensor and to direct operation of the first actuator and of the second actuator to obtain a desired temperature and a desired spatial distribution or a desired location characteristic of the spatial distribution of the sprayed particles.

Another aspect of the invention is a method of spraying a coating on a substrate comprising the steps of:
a) spraying a material with a spray tool to provide a spatial distribution of sprayed particles;
b) measuring said spatial distribution of sprayed particles or measuring a parameter of said spatial distribution of sprayed particles; and
c) providing automatic closed loop control over said spatial distribution of sprayed particles.

BRIEF DESCRIPTION OF THE DRAWINGS

The foregoing and other objects, features, and advantages of the invention will be apparent from the following detailed description of the invention, as illustrated in the accompanying drawings, in which:

FIG. 6 is a prior art diagram showing how each input variable is tied to more than one output variable;

FIGS. 7a and 7b are prior art test data from a plasma spray system showing input variables vs. output variables; FIG. 7d includes a transfer matrix relating the system inputs to the system outputs, a scaled transfer matrix relating the system inputs to the system outputs in which the inputs and outputs were nondimensionalized, the related condition numbers, and the relative gain array (RGA);

FIG. 8 is a prior art scaled transfer matrix and plot of input/output interactions;

FIG. 9 is a model-based feedforward control showing predicted outputs and experimental results;

FIG. 10 is prior art test data showing variation in output state for repeated nominal input conditions;

FIG. 11 is prior art test data showing output parameters for both sequential and non-sequential experiments;

FIGS. 14a, 14b, 14c is test data showing how a sudden change in current affects temperature, velocity and centroid position;

FIG. 21a is a schematic diagram showing a real time control system for maintaining plasma spray molten particle spatial distribution with a molten particle centroid sensor and a molten particle flux sensor with a MIMO control structure for centroid and a decoupled powder feed controller;

FIG. 21b is similar to FIG. 21a but sensors for temperature and velocity are also provided and fed back through the MIMO controller;

FIG. 23a is a similar to FIG. 21a but a standoff distance controller replaces the powder feed controller;

FIG. 23b is a similar to FIG. 21b but a standoff distance controller replaces the powder feed controller;

DETAILED DESCRIPTION OF THE INVENTION

Figure 1A:
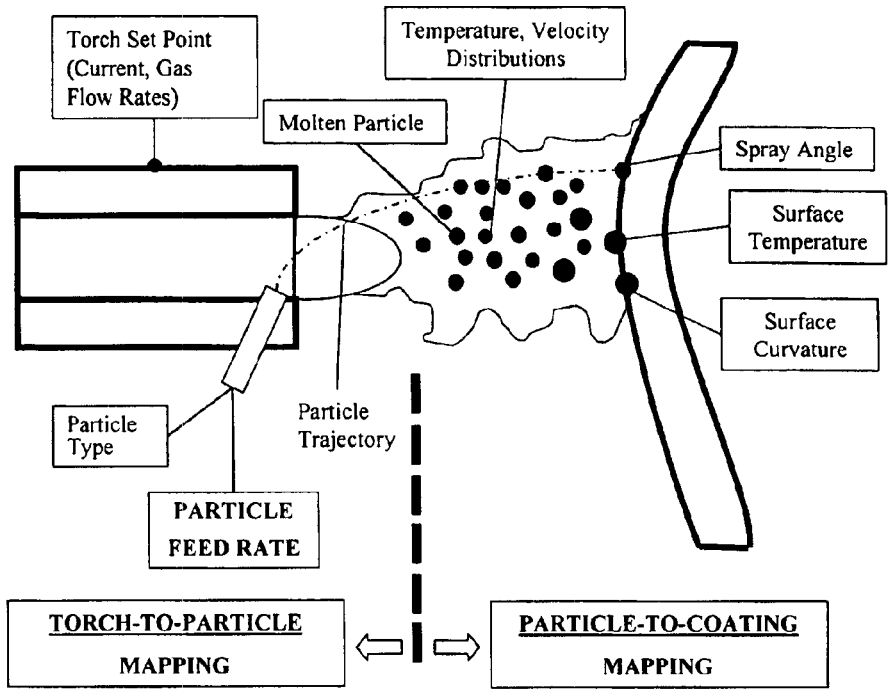
FIGS. 1a and 1b are schematic diagrams showing a plasma spray torch spraying particles on a substrate and showing the various control elements used in the present invention.
Figure 1B:
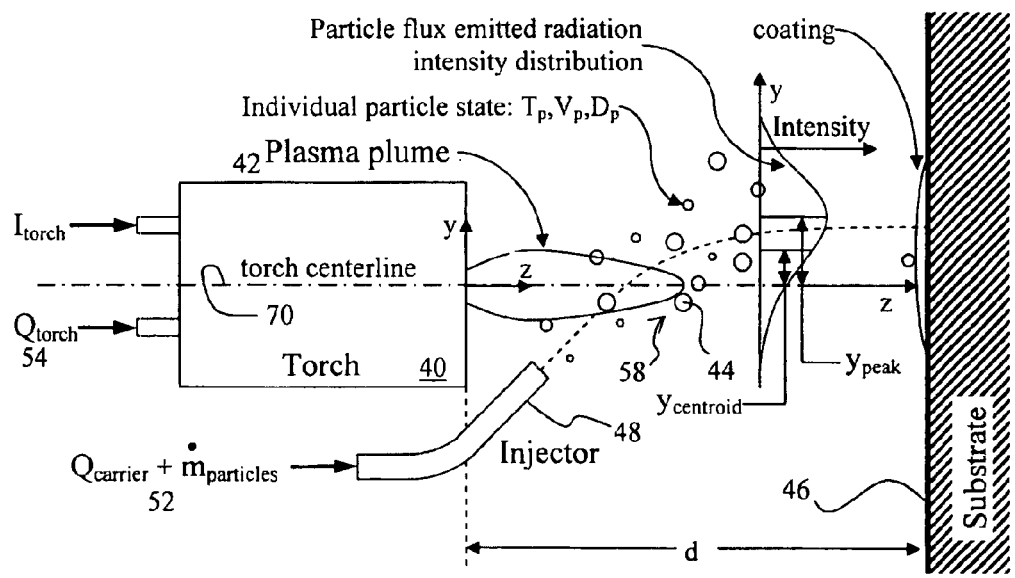

Important input and output process variables of a plasma spray process are schematically illustrated in FIGS. 1a, 1b, showing torch 40, plasma jet or plume 42, and particles 44 traveling from torch 40 to surface 46. Particles 44 are introduced into torch 40 as a powder through injector tube 48 along side 50 of torch 40. Carrier gas 52 carriers particles 44 of the powder through tube 48 and into torch 40. Alternatively, wire, liquid or suspension can be used for introducing feed material. Particles 44 are accelerated when they enter plasma jet 42 that passes through torch 44. Particles 44 are heated as they cross through plasma jet 42. Some of the particles are heated enough to melt, to provide that a substantial fraction of particles 44 are molten particles 56. Spatial distribution of particles 58 varies with distance from torch 40. Spatial distribution of particles 58 is affected by flow rate of carrier gas 52 among other conditions of the plasma jet 42.

Torch 40 includes several torch input parameters or set points that can be controlled by an operator or by an automatic control program, including torch current I, torch gas flow rate Qt, and carrier gas flow rate Qc, as shown in box 60. Particle type 61, particle feed rate 62, and standoff distance D are additional input parameters that can be controlled by the operator or control program, as also shown in FIGS. 1a, 1b. Other input parameters that effect coating properties include, substrate surface temperature 64, substrate surface curvature 65, and spray angle 66 of particles relative to surface curvature 65.

Particles 44 traveling in spatial distribution 58 have several output parameters that can be measured, including particle temperature, particle velocity, and particle size and the distributions 68 of those particle state parameters. Output parameters also include the flux of molten particles and unmolten particles (not shown) striking surface 46, molten fraction 56, particle trajectories (not shown), spatial distributions of particles 58, and rate of cooling after striking surface 46 (not shown). Molten particle flux is the mass of molten particles per second per square centimeter striking surface 46.

The present inventors found that the output parameters can be controlled by setting the input parameters, though as we will see, the relationship can be complex. For example, rate of cooling is determined by substrate surface temperature 64, as well as surface curvature 65, as shown in FIG. 1a.

The plasma deposition process includes several related interactions. First there is the interaction between torch 40, the controllable torch inputs, and resulting plasma jet 42. Second there is the interaction between plasma jet 42 and sprayed particles 44, including their spatial distribution 58, their temperature, and their velocity. These first two interactions are considered the torch-to-particle mapping. Third, there is interaction between these particle states and substrate surface 46 that determines the characteristics of the deposited coating.

The contributors to these three relationships are shown more explicitly in FIG. 1b which shows the relation between plasma jet 42 and the resulting spatial distribution of particles 58. This spatial distribution is measured by the intensity of light emitted from the hot particles, and a light intensity plot as a function of y distance from torch centerline 70 is shown in FIG. 1b. The light intensity emitted is a function of particle flux rate, particle cross sectional area, and temperature.

The present inventors recognized and demonstrated that parameters of coatings deposited by the plasma spray process is determined by deposition output variables including shape and lateral displacement of spatial distribution of molten particles 58' as well as by such output variables as particle temperature, particle velocity, particle size distributions, the mass flux of molten particles, and by conditions such as quality of feed material, cleanliness of the substrate, and substrate temperature.

They further provided insight into why standard open loop control systems—that seek to maintain constant input variables, such as current and gas flow—have not been particularly successful in providing reproduceable process results or maintaining a consistent high deposition rate.

They recognized that one of the complexities of plasma spray is the cross coupling between the manipulable inputs, including current, gas flow rates, powder feed rates, and standoff distance, and the process outputs, such as particle temperature, particle velocity, flux rates, spatial distribution, and molten fraction they found that when the torch current is changed, not only does the particle temperature change, so does the particle velocity, distribution pattern, and molten fraction, which in turn affect coating quality.

They discovered that an automatic system to measure and control specified deposition output variables, including spatial distribution of particles in combination with other output variables, substantially improved control over coating characteristics and deposition rate. They found that input variables, including current, plasma gas flow rate, carrier gas flow rate, and powder feed rate, were each linked to several of the measurable output variables. While this made such control more difficult they nevertheless provided ways to automatically vary the input variables to provide and maintain constant output variables.

They observed that the input/output relations and the coupling themselves change as the torch ages. Because of these changing relations and changing coupling, they found that simply having sensors for output variables available to the operator did not provide him or her with the information needed to determine the change in input levels needed to restore the desired deposition output conditions. The inventors recognized that even a computer assisted sort of scheme would be difficult to implement because of the changing state of the aging torch. Torch wear arises because of the DC arcing between the anode and cathode electrodes, and this wear is inherent to the process.

Another primary source of variation is observed each time the torch is turned on and off. The output characteristics of sprayed particles vary as a result of the torch history, and this memory effect is known as hysteresis.

A series of measurements taken while spraying turbine vanes illustrates the changes in torch properties with age and hysteresis and the resulting changes in particle state, spray pattern and coating thickness. The torch state was measured before each of 17 parts was sprayed. Variation in particle temperature, velocity, and centroid position from part to part is shown in curves 72, 74, 76 respectively of FIG. 1c. Over the course of 4 days, the temperature varied by 300 C (+/−7%), the velocity by 15 m/sec (+/−7%), and the centroid position by +/−6 mm (44%). These variations reflect aging of the torch, variation introduced by replacing worn electrode elements, and the hysteresis effect from turning the torch on and off. Corresponding variation in coating thickness measured at 49 points on the 17 vanes sequentially sprayed is shown in FIG. 1d, showing the effects of the widely varying output parameters of the torch.

As in this experiment, plasma spray deposition is typically operated in an open-loop fashion in that actuator set points, such as for current and gas flow rates, are developed empirically based on the user's process knowledge and experiments. Thus, there is no automatic adjustment of input levels to maintain the process and the particle state to adjust for process variations. Nor is there an easy-to-use method to determine the required set-points to achieve a desired set of coating properties. Process variations that occur include electrode wear over its 40 to 50 hour life operation and further variation introduced by multiple on-off cycles and maintenance.

The open-loop, or feedforward control of standard plasma spraying, uses either empirical (such as set by an operator) or model derived input signals to drive the plant. The advantage of feedforward control is that is anticipatory, and does not require an error to occur before changing the input. The achievable performance of feedforward control, however, is limited since there is no compensation for model errors, changes in the plant, or other disturbances. Here model error and disturbances can refer to unmodeled nonlinearities (such as hysteresis and/or arcing at a new point within the electrode), dynamics, and process variation such as electrode degradation.

The present inventors found that they could measure and more tightly control the output variables, including spatial distribution, by simultaneously adjusting two or more of the input variables to obtain and maintain control over each of the desired output variables. They thereby substantially improved control, improved run to run consistency of the coatings, and successfully adjusted input variables to overcome wear and aging of the torch and hysteresis, torch variability that depended on its history of use. They also provided a way to engineer coating parameters to improve their characteristics, including resistance to high temperature or wear, while providing for more consistent coating characteristics, higher deposition rates, and lower cost coatings.

One advantage of this closed loop control system is that the process remains fixed over a long deposition run, for example in coating a large turbine blade for a power generating system, as well from part-to-part, despite torch wear. Another advantage of the closed loop control is that input variables are automatically adjusted to compensate for the hysteresis affect.

The present inventors discovered that when any of the torch inputs are changed, the location of the centroid of the spray pattern, ycentroid in FIG. 1b, and the shape of the spray pattern changes. The location of the centroid of the spray pattern is the location of the center of mass of the sprayed particles. They experimentally showed that the distribution of particles or a parameter representing that distribution, such as the location of the centroid, was an important parameter to control. They found that changes in spray pattern shape or centroid location effect coating thickness. In addition, they have shown that controlling centroid position improves the ability to control deposition rate. They further found that control over the location of the spray pattern is important to ensure that a sensor consistently tracks the same portion of the spray pattern. Otherwise they found that the measurement could really be introducing variation, since they found that particle state varies with location from torch centerline 70.

The present invention provides ability to engineer coating structure, such as crack orientation, density and porosity for thermal barrier coatings while compensating for variations due to both torch aging and hysteresis. The strategy of the advanced control system described below is to replace controlling input variables, such as current and gas flows, to set points with controlling output variables to set points. Controlling the particle state, particle temperature and particle velocity, which directly affects the solidification dynamics, has a much more direct impact on coating structure than controlling the raw inputs to the torch (ie current and flow rates). The present inventors provide two related strategies in addition to controlling the substrate temperature. The first is to control the average particle states as well as spray pattern characteristics. The second is to filter the particle sensor data to control the parameters of the molten particles that wind up in the coating.

Figure 2:
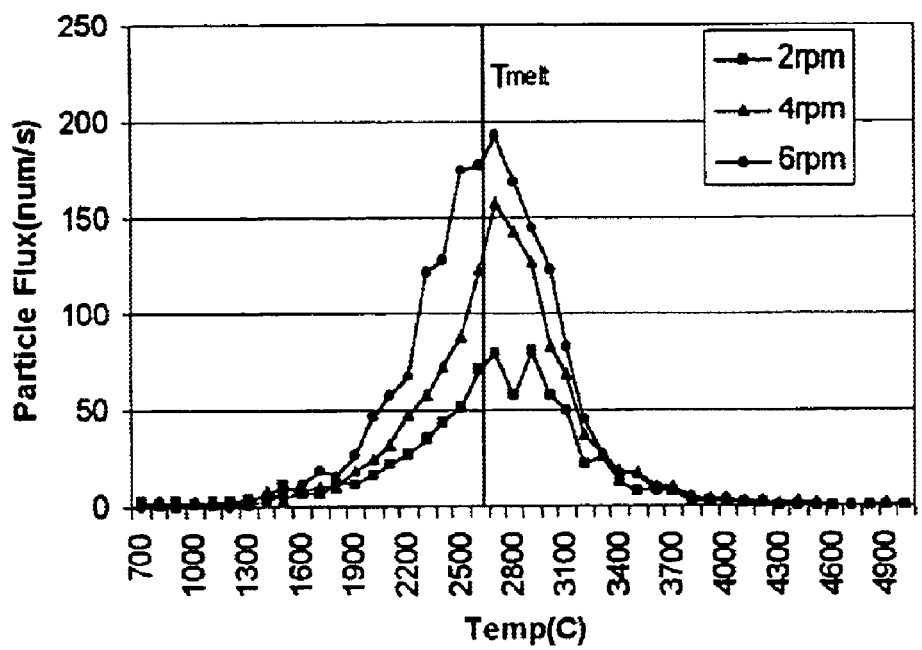
FIG. 2 is test data from a plasma spray system showing variation of particle flux with temperature showing how that variation changes for different feedrates, and showing how the molten fraction shifts with feedrate.

The present inventors recognized that a large fraction of the sprayed particles are not melted and do not wind up in the coating. This fraction is illustrated in the particle flux v. temperature distributions of FIG. 2 showing the flux having a temperature above Tmelt compared to the flux having a temperature below Tmelt. They therefore provided a scheme to distinguish between the flux of molten particles which wind up in the coating and the flux of unmolten particles that have been shown to have an impact on coating quality.

These measurements are used in a closed loop system to maintain a desired ratio of molten to unmolten particle flux, which provides a basis for optimizing deposition efficiency. Since powder costs can be a significant contributor to per part spray cost, this is an important factor in reducing the production costs.

Figure 3:
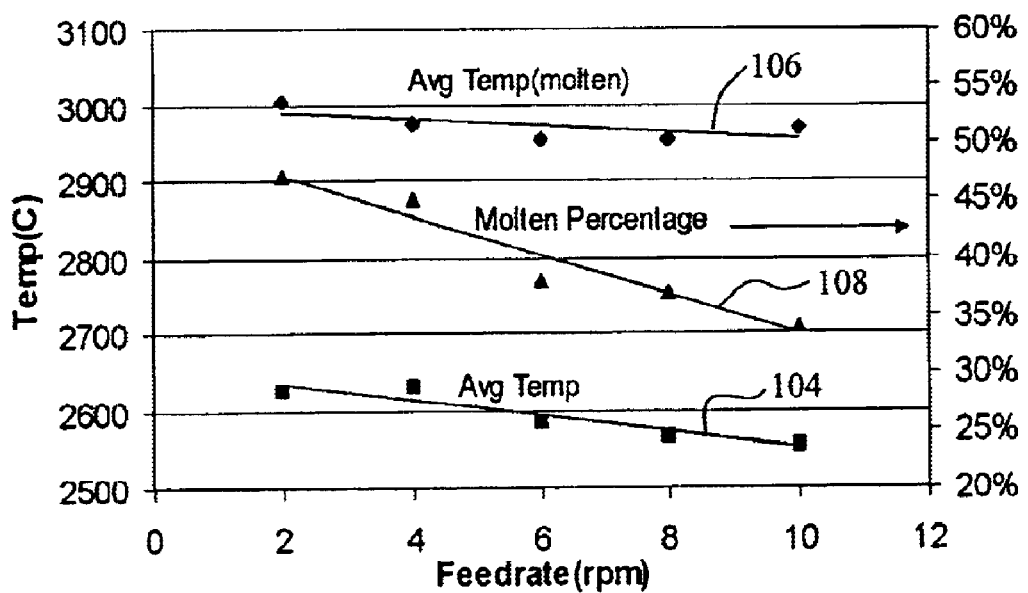
FIG. 3 is test data from a plasma spray system showing how average particle temperature and molten fraction change at different feedrates.
Figure 4:
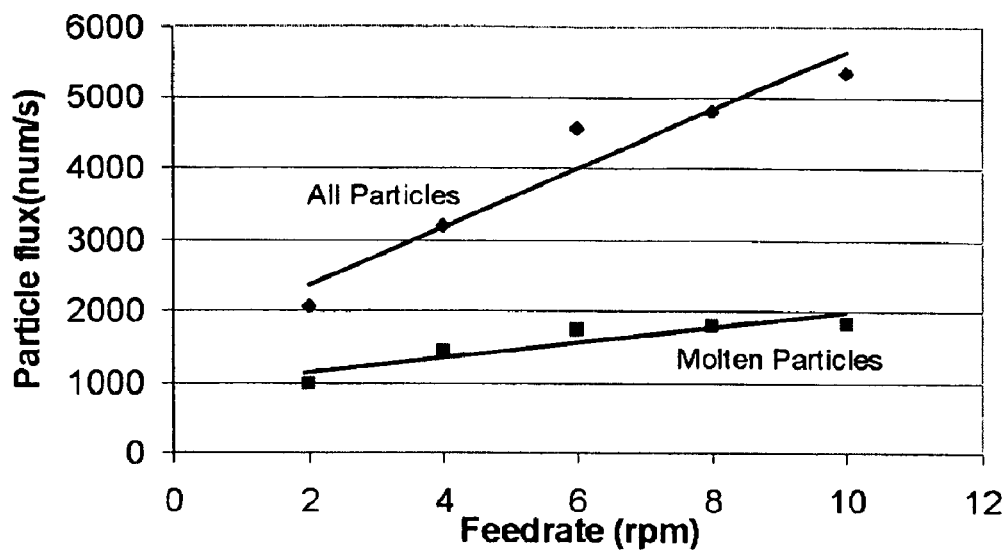
FIG. 4 is test data from a plasma spray system showing variation of particle flux with feedrate.

They experimentally found from particle state distribution measurements that averaged conditions do not represent the molten fraction, particularly in terms of the temperature distribution, as shown in FIGS. 3 and 4. The average temperature of molten particles is substantially higher than the average temperature of all particles, as shown in FIG. 3, and the average temperature of molten particles decreases more slowly with increasing feedrate than does the average temperature of all particles, as shown by the slopes of curves 104 and 106. However, the molten percentage decreases rapidly with feedrate, as shown by curve 108. Similarly, the flux of all particles increases much more rapidly with feedrate than the flux of molten particles, as shown in FIG. 4

Thus they devised a feedback strategy that uses statistics of particles having a temperature over a certain temperature threshold, typically the melting temperature. However, sensors are not absolute in temperature, and some particles may be partially molten and contribute to the coating, so preferably, the set point can be varied so as to better include the particles that are included in the coating. In addition, they included other molten particle variables in their control scheme, including flux rate of molten particles and molten fraction. They found that such a control scheme provides greater ability to engineer coating structure, including crack density, crack orientation, and porosity.

In terms of manufacturing, it is also important to be able to maximize deposition rate while also meeting coating quality requirements. Operating at maximum deposition rate is important since more parts can be coated with the same equipment and labor, thus minimizing cost. However it is critical that these high rates are sustainable independent of torch aging while maintaining the desired coating characteristics.

The present inventors recognized that deposition rate depends on flux of molten particles that will be incorporated into the coating and spray angle. Control of deposition rate also requires an additional input beyond those needed to control the particle state, such as powder feed rate or standoff distance. They found that their closed loop control system allowed them to increase deposition rate, while achieving the desired coating characteristics of crack density, orientation, porosity, etc.

Another advantage of the closed loop control system of the present invention is that it provides the ability to manufacture more complex coating structures, such as multi-layers, graded composition, and structures having different microstructures.

The present invention thus substantially improves plasma spray by economically depositing coatings in which the coating structure can be engineered to meet the specific requirements for a variety of applications. The economics are related in part to the high deposition rate and low cost (both capital and operating) of the process. An example of the desirability of engineering the coating structure is the coating structure requirements for thermal barrier coatings used in aircraft and power turbines. In thermal barrier coatings it is desirable to minimize horizontal cracks near the bond coat in order to minimize coating delamination. It is also desirable to maximize vertical cracks to provide thermal stress relief. It is also desirable to increase horizontal cracks in the body of the thermal barrier coating to increase thermal resistance. The challenge in terms of plasma spray control is to determine how to change the deposition conditions to achieve such a complex structure, as well as how to achieve this in every part that is coated within the required performance bounds. The present invention provides control over the deposition to accomplish this goal.

Besides controlling the coating microstructure, it is also important to be able to control coating thickness. For example, thermal barrier coatings usually require a maximum and a minimum coating thickness. Too thick a coating may result in coating cracking and failure, too thin a coating will not achieve the desired thermal protection. The challenge is to meet these thickness specs in spite of the variations due to torch aging and the complex part geometry offered by curved receiving surfaces. Those parts with too thick a coating can require costly hand rework, such as by sanding, which significantly increases the cost per part. One way to characterize the need to reduce the process variations is to characterize the standard deviation relative to the performance limits. The smaller the process variation is relative to the performance bounds, the less rework needs to be done.

Since the present inventors found that torch aging and hysteresis will introduce variation in the molten particle flux over time as well as from run-to-run, they recognized that torch input parameters should be adjusted to compensate for these variations. One strategy is monitor flux in real time and adjust input variables to maintain flux rate, thus compensating for the variation before it effects coating thickness. The scheme can be modified to also compensate for variations in effective flux rate due to complex surface curvature, using knowledge of the part shape to specify how the deposition rate set point should be varied with position. The result of this molten particle flux and deposition rate control system will be to reduce the variation of coating thickness, thus reducing re-work costs and increasing yield. In addition, it also provides for increasing deposition rate while still meeting coating thickness and other requirements. The importance of maximizing the deposition rate is that a greater number of parts can be coated using the same capital equipment and labor.

The real-time control of the present invention improves performance since any disturbance that has an impact on the control objectives is measured while the process is running, and the adjustable inputs to the system are varied to quickly compensate for the change in that measurement and bring it back to its set point. Thus, the magnitude of the variation can be significantly reduced, so the coating is almost invariant to disturbances acting on the system.

In current plasma spray production apparatus, only limited measurement instrumentation is typically used, such as to measure torch current and voltage. Of importance is the operator's ability to visualize and hear the torch spray pattern. However, it is interesting to note that data collected at one spray manufacturing facility has shown that coating thickness variation is actually increased somewhat when operators intervene compared to not having the operator intervene.

Even if a better set of sensors were implemented, it would still be a challenging job for the operator to determine how to change the various actuator set points, for example how to change torch current, plasma gas flow rate, and carrier gas flow rate, to correct for the variation observed by sensors. The present invention goes beyond providing that improved measurement system and direction-it makes the adjustments automatic and independent of operator intervention.

A major problem is due to the cross coupling between the current and gas flow inputs controllable by the operator and the particle states emerging from the spray tool. For example, the present inventors have found that when current changes, not only does particle temperature change, but also particle velocity and the spray pattern spatial distribution changes. While it is not inconceivable that some system could be devised to aid the operator in adjusting the actuator set points to account for this cross coupling, it will likely be complex and possibly fairly involved and time consuming. In contrast, the present invention provides the ability for the torch system to adjust itself automatically, as shown schematically in FIG. 5. Torch 40 sprays particles 44 in distribution 58 at surface 46. Particles 44 are measured with inflight particle sensors 76a to provide volumetric mass-weighted average temperature. Particles 44 are also measured with individual particle sensors 76b to provide particle temperature, velocity and size. Spray pattern sensor 76c provides spray pattern shape and centroid position. Substrate temperature is measured with optical pyrometer 76d. Measurements from these sensors are either directly provided to controller 78 or parameters, such as deposition rate, are calculated in estimator 80 and these calculated values are input to controller 78 which uses the measurements to adjust actuators 82 that control torch input parameters, including current, powder fee rate, gas flows, and substrate temperature, and standoff distance to better achieve the desired output parameters.

Figure 5:
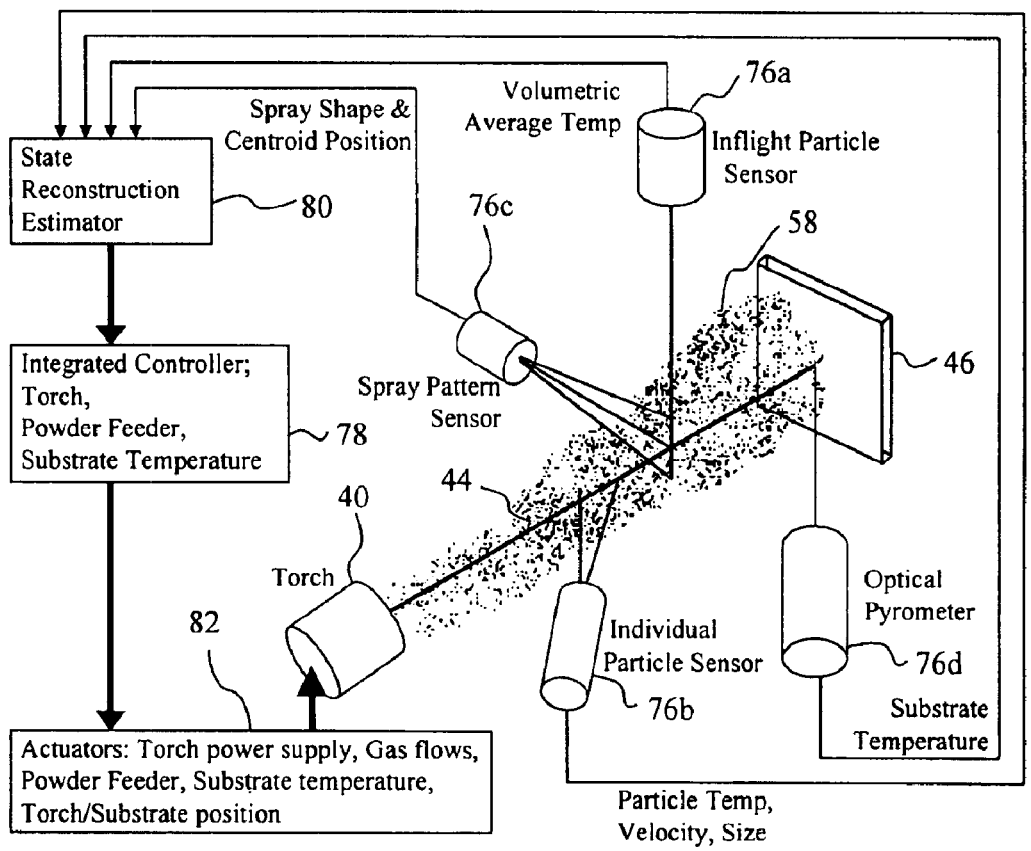
FIG. 5 is a three dimensional schematic diagram showing a plasma spray torch spraying particles on a substrate and showing the various sensors, feedback loops, and control elements used in the present invention.

The closed loop, or feedback control illustrated in FIG. 5 offers the opportunity to automatically compensate for variations as well to directly achieve the required spray conditions to achieve a desired coating structure. Feedback structures use measurements of the system output to continuously develop a corrective input signal by the controllers. Feedback control can allow the system to take corrective action in the event of a process variation or disturbance. The feedback system can automatically determine the input settings that achieves the desired outputs. And if output parameter set points are changed, the system can follow these command signals. Thus, feedback control provides the ability to correct for changes in the system and correct for modeling errors.

A paper by some of the present inventors, "System Characterization and Plasma-Particle Distribution Analysis for Development of a Closed Loop Control for Plasma Spray," HTD-Vol. 366-3: Proceedings of the ASME: Heat Transfer Division November 2000, Volume 3 pp. 419–426 ("the system characterization paper") describes a process to simultaneously control several degrees of freedom with several inputs—referred to as multiple-input-multiple-output (MIMO) systems. This kind of process can pose special difficulties in achieving desired performance because of the cross coupling of variables. For plasma deposition, important interactions include the coupling between the particle states (temperature and velocity) to the inputs torch current, I, and torch flow rate Qt, as shown schematically in FIG. 6, from the system characterization paper. The cross coupling, for example, refers to the fact that when the current is changed, both the particle temperature and velocity are affected, as shown in FIG. 7, also from the system characterization paper. Similarly, when the torch flow rate Qt is changed, both the temperature and velocity are also affected. For plasma spray control, the input-output coupling is really much more complex because there are up to five cross coupled input and five output variables, and one should consider all their cross coupling interactions.

As described in the system characterization paper, Miller AI 1075 ZrO2-8Y2O3 was sprayed using a Miller SG-100 plasma torch, with a 730 electrode combination and a 112 gas ring (no swirl). Nominal operating conditions were: torch current of 800 amps, plasma gas flow of 46 liters per minute (slm) (20 percent helium and 80 percent argon), carrier gas flow of 4 slm of argon and the rotary powder feeder was set at 4 rpm.

Steady state characterizations of the torch involved mapping the relation of plasma torch inputs to the particle states within the spray pattern (temperature, velocity and spray pattern location). The torch current was varied over the range from 700 to 900 amps, the plasma gas flow from 37 slm to 55 slm (keeping a 20/80 ratio of He/Ar), the carrier gas flow from 3 slm to 5.5 slm, and the powder feed was varied from 2–5 rpm.

Sprayed particle flow field diagnostics were obtained at a standoff distance of 10 cm, and included simultaneous measurement of particle size, velocity, and temperature, and spray pattern shape. Particle size and velocity were measured with an Aerometrics phase Doppler particle anemometer (PDPA). Temperatures of individual particles sensed by the PDPA were measured using a two-color pyrometer, with wavelength bands of 950+/−20 nm and 850+/−20 nm. The PDPA measurement volume was positioned to measure particle velocity in the spray direction, with a measurement volume that was approximately 1 mm in the direction transverse to the spray direction. The PDPA measurement volume could be moved in the transverse direction to provide particle-state profiles across the spray pattern. The steady-state input/output data was taken by moving the measurement volume to the centroid maximum.

The Inflight Particle Pyrometer (IPP), also a two-color device, was also used to measure temperature. The IPP averages over several centimeters in the transverse direction, providing an ensemble average particle temperature that represents a weighted spatial average over the width of the spray pattern. The IPP was positioned to measure temperature at the same axial location as the PDPA (10 cm).

A line-scan camera was used to measure the profile of the radiant intensity of the spray pattern in the transverse direction. This measurement provided a means for determining the size and location of the spray pattern and their variations with changing torch conditions. In particular, the centroid of the spray pattern was defined as the centroid of the signal from the line scan camera.

Our steady-state input-output study was conducted by varying each input while measuring three outputs. Inputs considered were the total plasma gas flow rate, torch current, and carrier gas flow rate, while outputs were the averaged particle temperature and velocity, and the centroid position of the particle spatial distribution (a total of 9 curves). Two representative relations from the system characterization paper are shown in FIGS. 7a, 7b in which the current was sequentially increased from 700 amps to the higher current levels.

Figure 7C:
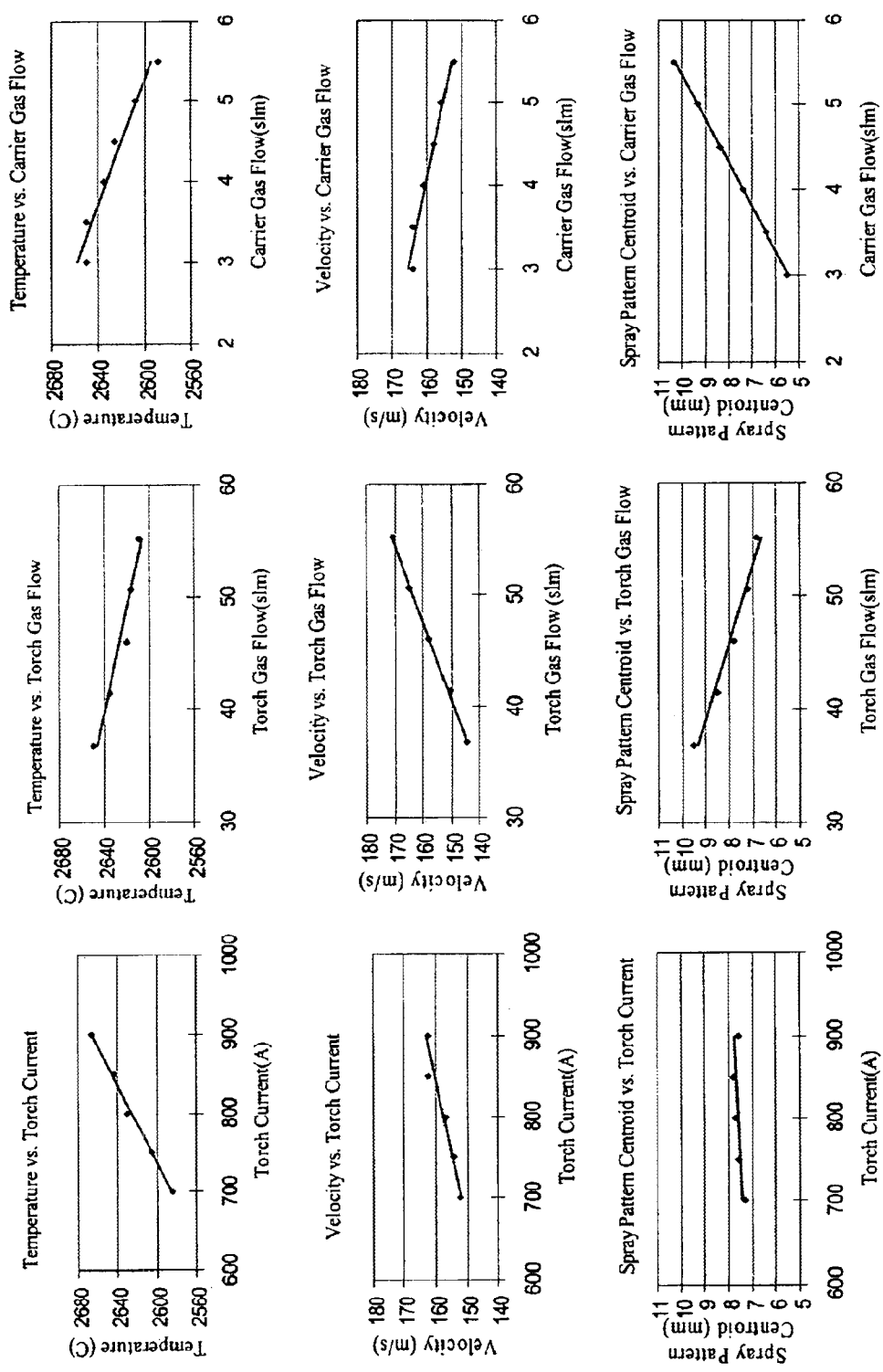
FIG. 7c is additional test data from a plasma spray system showing input variables vs. output variables.

A least squares linear fit to the data of all nine curves of FIG. 7c yields the transfer matrix, as shown in FIG. 8 from the system characterization paper, which is scaled by allowable perturbations of the inputs and sensitivity values for the outputs. These relationships are illustrated in FIG. 8 in a plot of the column vectors of G in the output space. Here, each vector I, Qt, −Qc reveals how the outputs are affected when a single input is varied. These relationships are valid for the change of operating values (+/−100 amps and +/−8 slm, corresponding to changes of +/−13% and +/−10% respectively). This plot suggests that choosing current and torch gas flow rate can allow one to independently control particle temperature, and velocity. Since −QC and I have similar impact in terms of direction, they should not be paired together.

The nearly linear input/output mappings found in FIGS. 7a, 7b from the system characterization paper suggested that implementing a model-based feedforward controller would be reasonable. The desired output conditions shown in FIG. 9 (diamonds) from the system characterization paper were chosen to determine the impact of independently controlling particle temperature/velocity on the resulting coating structure (points 8, 1, and 4 are velocity while points 3, 1, and 2 are temperature). While some of the actual output points (squares) were close, others had significant errors (including sign changes relative the nominal base case).

Additional steady-state experiments were conducted to determine the reason for this failure. Instead of a sequential sweep of a single input, we varied the input conditions in a non-sequential manner. Plotting the output results for all the nominal input cases, as shown in FIG. 10 from the system characterization paper, revealed that it is not possible to depart from and then return to a nominal particle state.

The non-sequential experimental results were also compared to the original transfer matrix results, shown in FIG. 11 from the system characterization paper. The significant variations indicate that the torch results are highly dependent on the path taken since the sequential tests result in a highly structured relationship and the non-sequential are not well correlated. This behavior suggests some sort of hysteresis since the output state is dependent on the path the torch took to get there.

We concluded that a feedforward based controller could not achieve control of the process within tight bounds and could not ensure that the desired spray conditions are achieved every time the torch is turned on and off and/or changed. We therefore turned to a measurement based feedback control system. The hysteresis implies that real-time feedback control is required to maintain even a nominal point for an extended deposition period (relative to the life of the electrode), or if it is desired to change the nominal particle state to achieve graded coating characteristics.

Figure 12A:
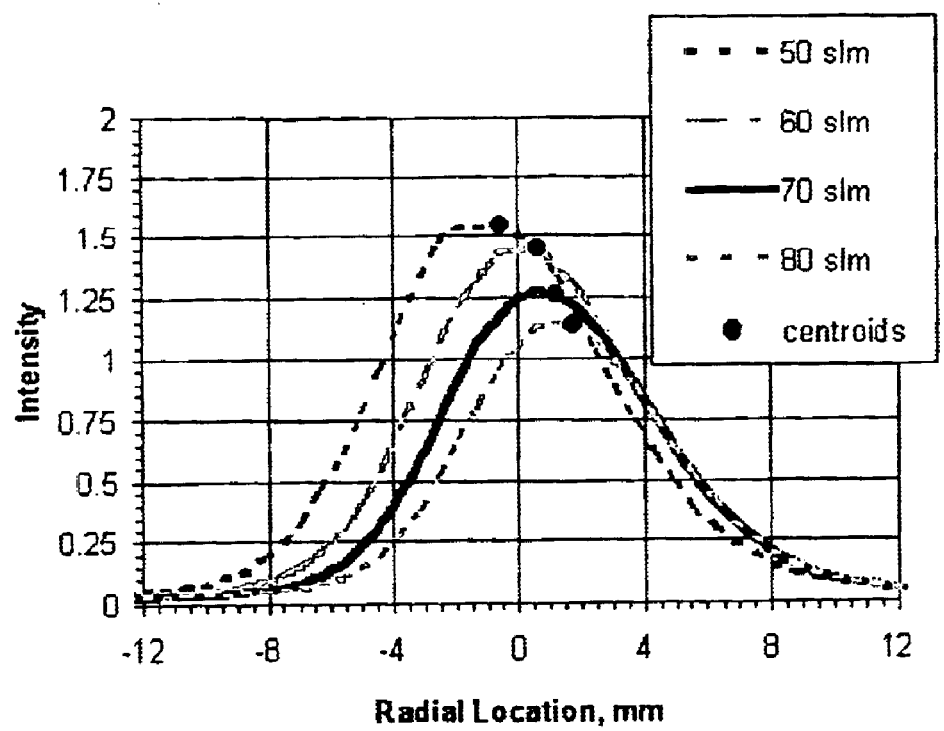
FIG. 12a is test data showing light intensity emitted by sprayed particles as a function of radial location for different torch flow rates.

A light intensity scan across a cross section of plasma jet 42 for different torch gas flow rates Qt is shown in FIG. 12a. For each gas flow rate the light intensity varies with radial location, or distance from centerline 70 of plasma jet 42, as expected. In addition, the data shows significant shifting of the light intensity vs. radial location as torch gas flow rate changes. The present inventors found similar changes in peak and centroid locations as other input parameters changed, including torch current and carrier gas flow rate.

Figure 12B:
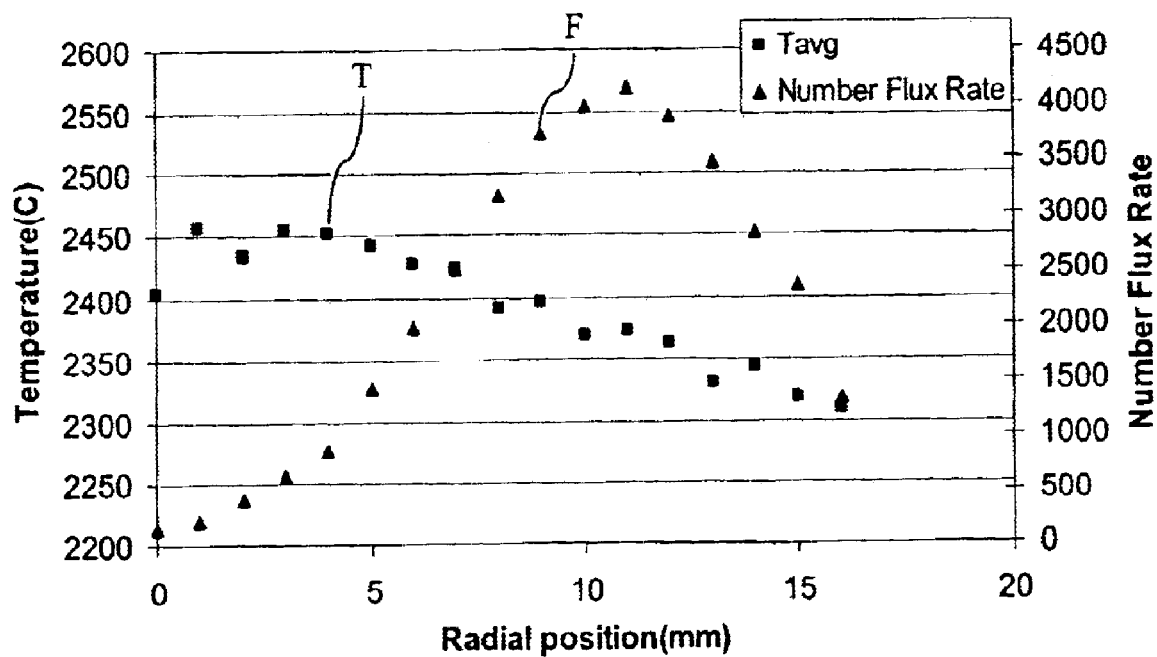
FIG. 12b is test data showing how temperature and flux light vary with radial position.

The light intensity emission at each point in the spatial distribution scanned is a complex convolution of particle temperature at that point and number density of particles, which is related to the flux of particles. The relationships between particle temperature and number flux and radial position are illustrated by curves presented in FIG. 12b. It is seen that in plasma spray, the temperature peaks at the torch centerline, which is centerline 70 of plasma jet 42, as illustrated by curve T of FIG. 12b, which peaks at around 0 mm radial position. Number density and flux of particles, however, have an off-axis maximum at around 12 mm radial position in curve F because the particles are injected into the plasma jet from side 50 of torch 40 in carrier gas 52 having carrier gas flow rate Qc, giving them a sideways velocity in addition to the forward velocity they experience from their acceleration in much larger torch gas flow Qt. Thus, the shifting of the maximum and centroid of light intensity scans from the centerline in FIG. 12a with torch gas flow rate is therefore fairly representative of the shifting of the number density, flux, and spatial distribution of particles from centerline 70 of plasma jet 42.

The present inventors recognized that the shifting of the radial location of the peak of the light intensity distribution and the radial location of the centroid of the light intensity distribution as torch gas flow rate, torch current, or carrier gas flow rate changed meant that the spatial distribution of particles 58 was shifting as any of these parameters changed.

The present inventors also recognized from these plots that control of torch outputs must include control over spatial distribution of particles 58 and that choice of control logic, sensors, filtering algorithms, and control laws should include devices for detecting that spatial distribution or a parameter such as centroid position, that was characteristic of the distribution.

In addition, in view of the temperature distribution of FIG. 2 showing that only a fraction of the YSZ particles have surface temperatures above the melting point, and the variation in temperature with feed rate shown in FIGS. 2, 3, and 4, the present inventors recognized that control should focus on the spatial distribution of molten particles 58'—the particles that stick to the surface—rather than on the entire distribution of particles 58 or the average of that entire distribution. They recognized that controlling to the averages would not be indicative of the distributions that actually determine the coating.

The temperature distributions in FIG. 2 also show an increasing fraction of particles having a temperature below the melting point as feed rate increases. The decline of average temperature of all particles as feedrate increases is also evident in curve 104 of FIG. 3, while the more gradual decline of average temperature of molten particles with feedrate is seen in curve 106. Specifically, the average temperature of all particles declines by 72° C. while the average temperature of molten particles declines by only 52° C. as feed rate increases from 2 to 10 rpm. Consistent with this is 28% decline in the percentage of molten particles over this same change in feed rate, as shown in curve 108. Examination of the relative flux rates in FIG. 4 shows that increasing the powder feedrate is likely to result in an increase in deposition rate because the flux of molten particles does increase, but the increase is much more gradual than the increase in flux of all particles, suggesting a substantial decline in deposition efficiency.

Thus, the present inventors recognized that for improved control over deposition rate and coating thickness, it is important to be able to directly measure the spatial distribution of the molten fraction or parameters indicative of that distribution, such as peak and centroid position, and that measurement of averaged quantities for all particles will be misleading. In terms of developing a better understanding of the process-property mapping, the data suggest advantage in obtaining distinctive characteristics of the molten fraction, which are not satisfactorily revealed by the ensemble averages.

Figure 13A:
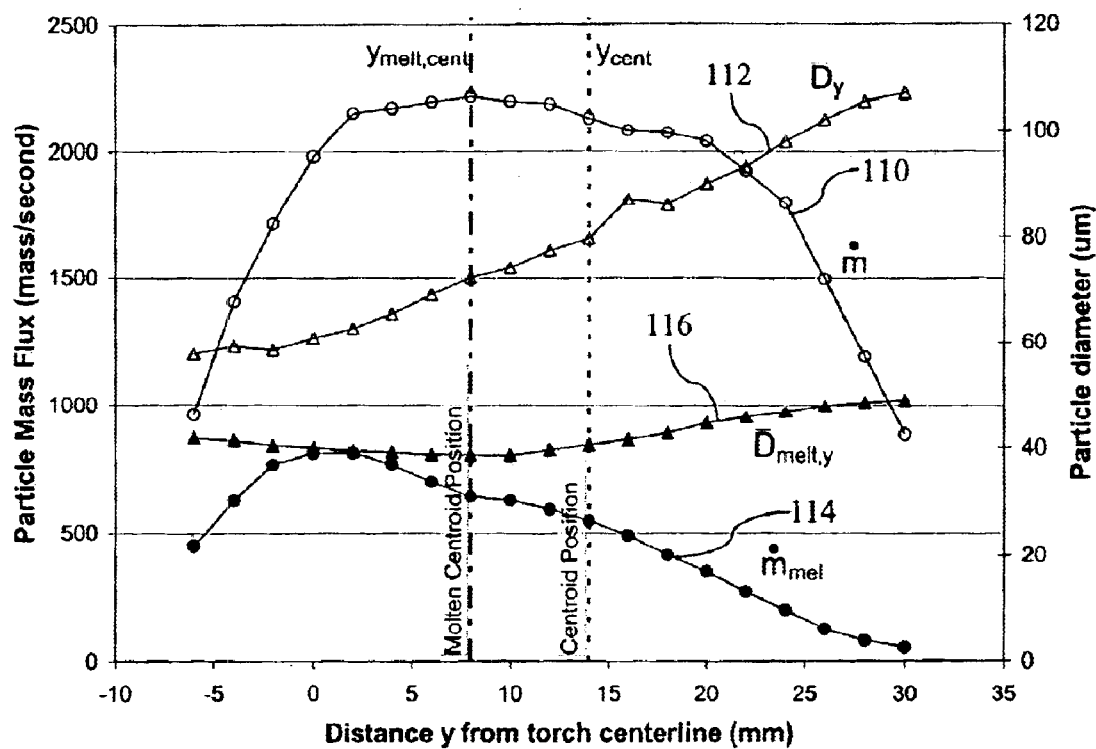
FIG. 13a is test data showing how temperature and velocity vary with radial position or distance from the torch centerline.
Figure 13B:
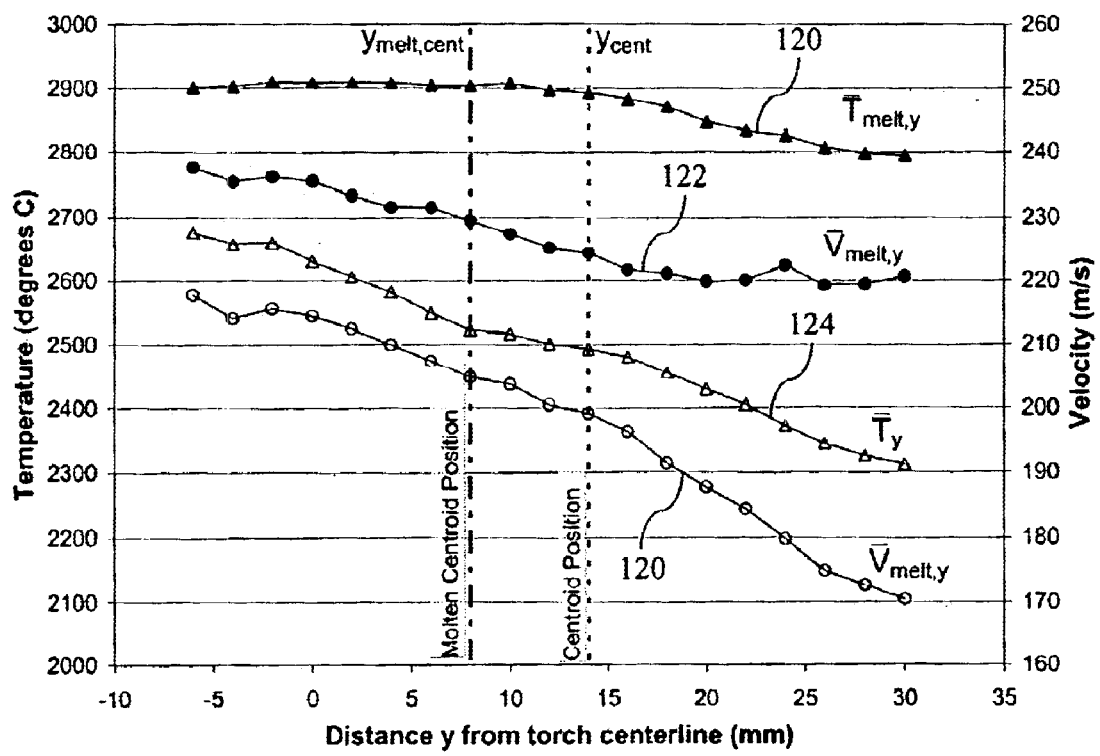
FIG. 13b is test data showing how particle mass flux and particle diameter vary with distance from the torch centerline.

An illustration of the typical differences between the molten and total particle distributions, and the resulting impact on measuring particle state and mass fluxes is shown in FIGS. 13a, 13b. This data is obtained from a typical spray condition by measuring the individual particle statistics in terms of their spatial distribution relative to the torch centerline (e.g. y coordinate). Curve 110 plots the total mass flux rate and curve 112 the total particle diameter, curve 114 the molten mass flux rate, and curve 116 the molten particle diameter. Molten particle flux and diameter are taken for particles having a temperature above the melting point or above a specified threshold temperature. These curves were calculated from the measured particle temperature, velocity, and diameter data taken from the Inflight IPM 3000 sensor, which also provides a measure of particle flux rate, the number of particles per unit area per second. Molten particle mass flux curve 114 and molten particle diameter curve 116 are significantly different in form then total mass flux curve 110 and total particle diameter curve 112 of FIG. 13a.

Similarly, location of the centroid position for molten particles ymelt,cent is substantially shifted from location of the centroid position for all particles ycent, as also shown in FIG. 13a. Thus, the present inventors confirmed the desireability of scanning the particle plume and calculating the molten mass flux and centroid position of the molten mass flux.

In addition, curve 120 of temperature and curve 122 of velocity of molten particles in the plume differs substantially from curve 124 of temperature and curve 128 of velocity for all particles, as shown in FIG. 13b, indicated substantially different temperatures and velocities for the two distributions. The present inventors found that measuring and controlling based on measured parameters of the molten particles gives substantially better results than measuring and controlling based on measured parameters of all particles.

The various embodiments of the system for control in the present invention use sensors that can measure output parameters, such as centroid location and average particle velocity and temperature, The centroid corresponds to the radial location of the "center of mass" for the spray pattern. Some or all of these output characteristics are then controlled in real time to set points set by the operator or control program. The control is provided by the system automatically varying input parameters, including current and gas flows. Because of the cross coupling effects described herein above, in which changing one input affects all of the outputs, controllers that accommodate the cross coupling are desirable.

The nature of the cross coupling of the torch-particle mapping is illustrated in FIG. 7c which shows three output variables, particle temperature, velocity, and centroid position, and how they are affected by a change of each input variable, current, torch gas flow rate, and carrier gas flow rate, in a sequential scan. The effect of the cross coupling is seen in that there is a significant change in output value as each input is changed. Thus, as one looks at a column of the figures, one sees that all outputs are affected when only one input is changed. The one exception is between current and centroid position where this data shows that centroid position does not substantially shift as torch current changes.

Ideally, a control system independently controls each of the outputs so the user specifies its value and the control system maintains that value. However, the cross coupling illustrated in FIG. 7c limits the degree to which one can independently control all outputs. The cross coupling also limits which input variables can be used together to control each output parameter. The input variables chosen should have a significant impact on the desired output while having lesser impact on other control loops.

To begin the analysis of control structure, we utilize the input-output relations that are experimentally obtained for the system in FIG. 7c which can be expressed in terms of the input/output matrix shown in FIG. 7d. Each number in the matrix represents the steady state value between the output and the corresponding input. A large number thus represents the fact that the input will have a significant impact on that output.

There are several factors that should be considered to determine whether it is at all feasible that the outputs can be independently controlled given the selected inputs, and if so, whether a decoupled control structure will work, or whether a more complicated MIMO controller that takes the coupling into account must be used.

The first factor is to evaluate the condition number of the system. The condition number is the ratio of the largest singular value of the transfer matrix G to the smallest singular value of the matrix (FIG. 7d, line 3). A scaled matrix is used in order to reflect the allowable variations in input values, and the desired tolerances of how tight one seeks to regulate the output values. In FIG. 7d, the inputs were scaled (nondimensionalized) by I=100A, Qt=9.2 slm, Qc=1 slm; and the outputs were scaled by tolerance requirements: T=50C, V=12 m/s, Ycent=11 mm, It is widely know that systems with condition number above 10 cannot easily be controlled. In this case, one must decide which of the outputs must be eliminated as well as choosing which inputs to achieve the best possible control (reflected by reducing the condition number). Thus, for input/output curves identified in FIG. 7C and represented by the scaled matrix (G̃) in FIG. 7d, the condition number is 3.3, indicating that it is reasonable to control all 3 degrees of freedom.

The second factor is to determine to what degree 3 independent loops can be used without explicitly compensating for the cross coupling interactions. The problem that could exist is that the cross coupling will cause the loops to interact, and in some cases, wind up being unstable. The technique we use is the relative gain array (RGA) which is calculated from the system matrix G as shown in FIG. 7d, item 5. Each component of the array is a factor that indicates the appropriateness of coupling each output with a particular input. Appropriate choices of independent input-output loops are indicated by relations in the RGA that are positive and values close to 1. Pairings with values close to 0.5 will result in large interactions, which might indicate the desirability of using either a decoupler strategy or more complex MIMO control algorithm (which explicitly takes the cross coupling into account in the control algorithm). For the plasma torch experiments, we find that for this operating point, one should pair the centroid position with carrier gas flow rate, particle velocity with torch gas flow rate, and particle temperature with current, although the latter loop will result in a significant impact on particle velocity.

If a decoupled control system is desired, that is individual loops for each output, one must then select a control algorithm used in each loop's controller. There are a variety of control algorithms that are typically used. A common one that is widely available in either stand alone hardware, such as the model T630C from Foxboro, now Invensys, is a PID controller and one must then specify the control gains used (3 gains to be selected). Selecting gains can be accomplished automatically by the controller by providing a step input, measuring a response, and then identifying gain and time constant. Alternatively, the user can conduct system identification experiments explicitly, as shown in FIGS. 14a, 14b, 14c. The experimenally derived model of the process can be used to determine the control gains. Alternatively, internal model control can be used, in which the control gains are determined directly from calculations based on the identified model of the process.

Alternatively a decoupler may be designed to minimize the cross impacts that might adversely affect performance. Such a decoupler can be designed using standard strategies used in chemical engineering which are implemented in terms of an inverse of the system model, similar to Internal Model Control for a multiple-input-multiple output system described in section 16.3.3 and 17.7 of the book ""Process Modeling, Simulation, and Control for Chemical Engineers", W. L. Luyben, McGraw-Hill, 1989. Here the model can either be of the steady state input-output gains, or it can include dynamic elements that represent the dominant dynamics of the system.

Figure 17A:
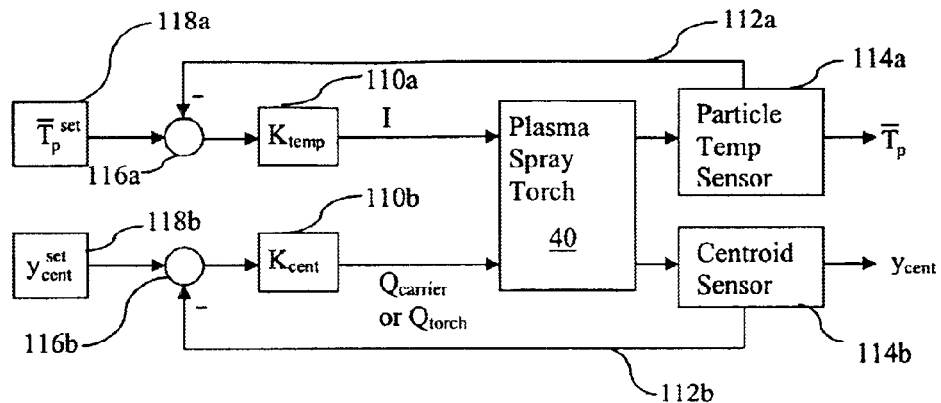
FIG. 17a is a schematic diagram showing a real time control system for maintaining plasma spray spatial distribution with a centroid sensor and an average particle temperature sensor, with a decoupled control structure.
Figure 17B:
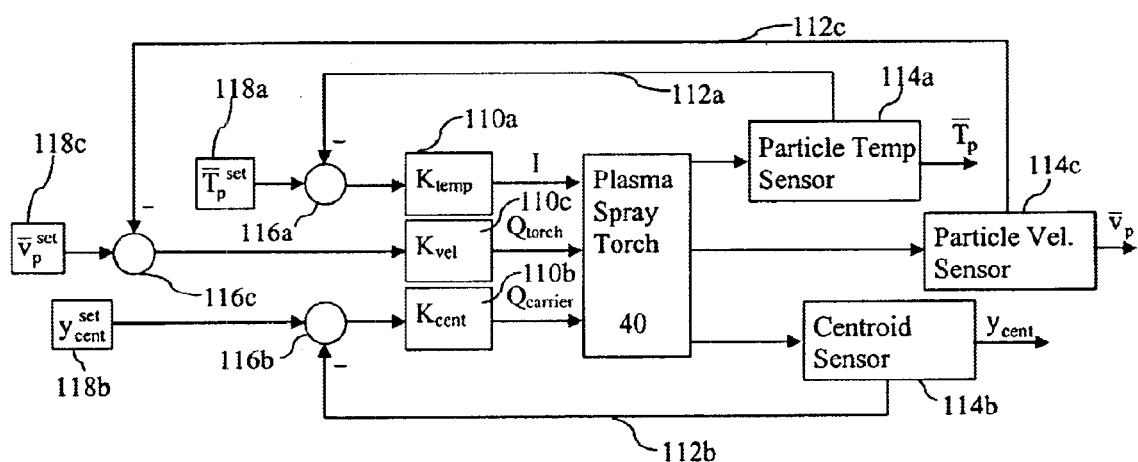
FIG. 17b is a schematic diagram similar to FIG. 17a showing a real time control system for maintaining plasma spray spatial distribution with a centroid sensor, an average particle temperature sensor, and a particle velocity sensor with a decoupled control structure.

The simplest form of control structure that accommodates the coupling uses independent controllers 110a, 110b, where each output loop 112a, 112b, taking data from sensors 114a, 114b, is tied to a single input summing junction 116a, 116b, as shown in FIG. 17a. Preferably, one should characterize all the input/output relations to determine which input is most strongly tied to which output, as shown in FIG. 8. This knowledge is then used to select the appropriate input-output pairings, as illustrated in FIG. 17a where current is used to control temperature and torch gas flow Qt or carrier gas flow Qc is used to control centroid position ycent. Temperature sensor 114a reads average particle temperature.

Temperature sensor 114a is can be a 2 color pyrometer that images a large volume of light emitted from the particles to get a spatial average of those particles in an instant in time. Such an Inflight Particle Pyrometer (IPP) sensor is available from Inflight Ltd. Additionally, any of several sensors that measure individual particles, such as the Inflight IPM-3000 can use a temporal average of the individual data to provide an average temperature. However, some sensors limit how fast the controller may operate. The average particle temperature reading is subtracted from desired and preset average particle temperature setpoint 118a in summing junction 116a.

Summing junction 116a is implemented either as an analog circuit, such as by an op-amp, or as a digital algorithm implemented on a computer or DSP chip. The difference or error in average temperature from summing junction 116a is fed to automatic controller 110a which has an algorithm to change power supply current I to torch 40. Automatic controller 110a is a PID controller. A typical power supply that is used in plasma spray is the Praxair PS-1000 power supply which is capable of delivering up to 1500 amps of electrical current. The actual output is determined by a 0–10 volt signal supplied by an external source, here our control system. The power supply maintains the specified current to within 1 percent of the set-point determined by the 0–10 volt signal.

The hardware needed to implement the different control architectures require the ability to take the various sensor signals (primarily as analog signals, but also possible as digital words) in, calculate the different error values (i.e. summing the set point to the negative of the measured signal), and then using this error signal in a control algorithm (such as a standard PID control equation or a more complex MIMO based control algorithm).

Stand-alone PID controllers, as well as a more integrated data acquisition and control system, such as offered by National Instruments, can be used.

The control system reads sensor signals, including particle state (temperature, velocity, and diameter), centroid position, molten flux rate, and particle flux rate. Some of these signals, such as centroid position, mass averaged values of temperature and velocity, and molten flux, might actually be computed as part of the data acquisition and control system algorithms instead of directly by the sensor. In addition, it is typical practice to also record the corresponding values of torch primary gas flow rate, torch secondary gas flow rate carrier gas flow rate, torch current, torch voltage, substrate temperature, as well as other system operating conditions, which can be accomplished by the same control hardware. One or more gases may be used for forming the plasma, including nitrogen, argon, and hydrogen. The gases may be used in combination. To implement the control algorithm the controller communicates with to the various actuators, including those controlling torch primary gas flow rate, torch secondary gas flow rate, carrier gas flow rate, torch current, and powder feed rate. These signals are also typically analog 0–10 volt signals. Digital words can also be used, such as for the powder feeder.

One system that is capable of the required input/ouput and computational tasks to implement the control architectures of this invention is the National Instruments (NI) data acquisition and control cards. These cards enable a host computer to run the NI Labview software, which implements either standard control algorithms (such as PID) or enables the user to specify their own code, such as required for implementing model based Internal Model Control or decoupler strategies. For example, one could use the DaqCard6715 Analog Output Card which delivers +/−10 Volts to 8 channels with 12 bits of resolution. Output values can be updated at a rate of 1 Mhz. The various sensors can be connected to a PCI-MIO-16E-4 and DaqCard-AI-16E-4 Multifunction Data Acquisition Cards. Both devices are capable of measuring +/−10 Volt signals with 12 bits of resolution as well as digital inputs. Signals are measured at a rate up to 250 kHz.

An alternative to implementing the control algorithm on a standard personal computer and on National Instruments input/output cards is to use a special card with its own microprocessor to implement and solve the control algorithms independently of the host computer. National Instruments' PCI-7030E is capable of monitoring 16+/−10V signals and controlling 2+/−10V signals with 16 bit resolution and sampling/updating rates at 100 kHz. The device contains 8 Mb of memory for control algorithms which are downloaded from the host computer.

It is also possible to implement the control algorithms using independent process controllers which operate as stand-alone devices. Red Lion Controls manufactures a line of modular process control devices. The CSMSTR module is capable of hosting up to 16 CSPID modules. Each CSPID module accepts one 0–10V process signal with 16 bit resolution and outputs one 0–10V command signal with 500 $\mu$V resolution. Both input and outputs sample/update at 15 Hz. PID control gains can be predetermined and set on the device via Ethernet communications and a personal computer.

Spatial distribution sensor 114b detects position of centroid of spatial distribution 58. Spatial distribution sensor 114b can be measured with a line scan CCD camera, such as that supplied by Inflight in their Torch Diagnostic System (TDS), that measures the profile of the radiant intensity of the spray pattern in the traverse direction. This pattern is used to determine the spray pattern centroid, maximum (e.g. peak) and half width that characterize the spray pattern. The centroid may also be calculated from individual particle measurements obtained by a sensor that traverses the spray pattern, by explicitly calculating the distribution obtained by individual particles as a function of position. In this case, one must set the distance between positions and take data for a fixed amount of time. This method also provides the option of calculating the centroid position for particles above a specific temperature such as the melting point, as shown in FIG. 13*a* to have a different distribution and position then for of that for all the particles. Individual particle data maybe taken by instruments from several vendors such as the DPV-2000 from Tecnar and the Inflight Particle Monitor (IPM-3000). These sensors measure particle temperature, velocity, and diameter which may then be averaged and used to determine both the spatial averages used for control and the centroid position. Sensors maybe based on single point measurements wherein the sensor head is scanned to image an entire plume.

The centroid position reading is subtracted from desired and preset centroid position setpoint 118*b* in summing junction 116*b* implemented either as an analog circuit such as by an op-amp, or as a digital algorithm implemented on a computer or DSP chip. The difference or error in centroid position from summing junction 116*a* is fed to automatic controller 110*b*, also a PID controller which has an algorithm to adjust torch gas flow or carrier gas flow to torch 40. Gas flows may be regulated based on a 0–10 volt signal from a control system utilizing standard mass flow controllers such as those from MKS or Unit Instruments. These devices are calibrated to work for specific gases used in the torch, as well as over a specific gas flow range. They take inputs from the central gas mass flow control/power supply such as Unit Instruments URS-100-5 Readout Power Supply. Each mass flow control accepts a 0–5V command signal and outputs a 0–5V actual flow signal, interpreted as a fraction of the mass flow controller's maximum calibrated flow rate. The URS-100-5 supplies not only the power for the individual MFC's, but also implements the local control algorithm that determines how each mass flow controller should respond to both the command signal and the measured response. The URS-100-5 operates in an automatic mode, where it supplies the 0–5V command signal to the mass flow controllers in accordance to an external computer-supplied set point signal.

A separate control algorithm is implemented for each control loops. Control gains used in that algorithm are experimentally determined. An off the shelf PID controller, such as the Foxboro T630C may be used for contoller. The three controller gains, for the proportional, integral, and derivative actions of the controller are determined experimentally, as illustrated in the flow chart in FIG. 15, which shows the steps used to determine these three PID control gains for the various embodiments of control described in FIGS. 17*a*–27.

As shown in step 90 of FIG. 15 the first step is to experimentally determine system response characteristics. This includes measuring the input/output relationships, as illustrated in FIG. 7*c*, obtaining gains, from the slopes of the curves. Similarly, it includes measuring timing, as illustrated in FIGS. 14*a*–14*c*, and determining time constants for all input/output relationships.

In the next step, performance objectives to meet plasma spray requirements are determined, as shown in step 91. This step is accomplished by specifying desired system settling time, permitted steady state error, how far a parameter can overshoot the set point when following a command, and robustness to model error. These parameters are set to allow control for spray coating a part to take a reasonable amount of time.

In the next step, a trade-off analysis is performed, as shown in step 92, that uses the performance objectives of step 91 and the system response characterists experimentally determined in step 90 to determine achievable closed loop objectives for the PID controller. For example, trade off between speed of attaining a new setpoint and system stability may be provided. Achievable objectives are also determined considering the capabilities of the PID controler.

The three PID control gains are determined based on solving an equation of the type illustrated in step 93 using the results of steps 90 and 92. The results of step 92 tells the performance metric to optimize and the system response characteristics of step 90 are used as values in the equation illustrated in step 93.

In the next step the three calculated PID control gains are provided to the PID controller, as shown in step 94. Based on these three numbers the PID controller is expected to provide the closed loop control of the input/output parameters.

Next, the system is used experimentally to test whether the closed loop response PID controller works, as shown in step 95. That is, whether it reaches and maintains the set points set by the user, whether it returns to those setpoints when changes to another set point are made, and whether it automatically adjusts for aging and hysteresis. According to decision step 96, if it does not meet these objectives, changes are made in the trade-off analysis step 92 and the PID control gains are correspondingly adjusted. If it works, then closed loop operation has been enabled for those input-output parameters, as shown in step 97.

The model values will be used either with an optimal control algorithm or in a internal model control technique to determine the control gains, as described in step 93. However, an important consideration is to determine the performance objectives for each loop, primarily how fast and with what steady state accuracy, as well as how the loops act together—the magnitude of cross talk interference, as described in step 91. One important consideration is that the centroid control loop should act the fastest of the loops if sensor data is being taken from one region within the plume. Otherwise, the temperature and velocity measurements will not reflect a consistent sampling point, resulting in at best a transient error, increasing the settling time of the system, and possibly driving it unstable. Standard control tuning procedures can easily incorporate-a specification of desired closed loop time response.

The desired closed loop settling time performance objective is also related to how the closed loop system would be used in a production cell. Since currently, the majority of sensors available on the market are sensitive to reflected light from surfaces during deposition, as well as the possibility of observing particles that bounce back into the imaging volume from the surface, it is preferable to not implement the controller to act while a part is being coated. Instead, the control system would most effectively be used at the beginning of the part deposition process, and possibly at intermediate times, but with the torch brought to a home position where the sensors are located. As such, the time constants of the closed loop system would be chosen to enable the torch to be brought back to its set point conditions for particle and spray state in a reasonable amount of time, on the order of a minute.

Figures 16A, 16B, 16C:
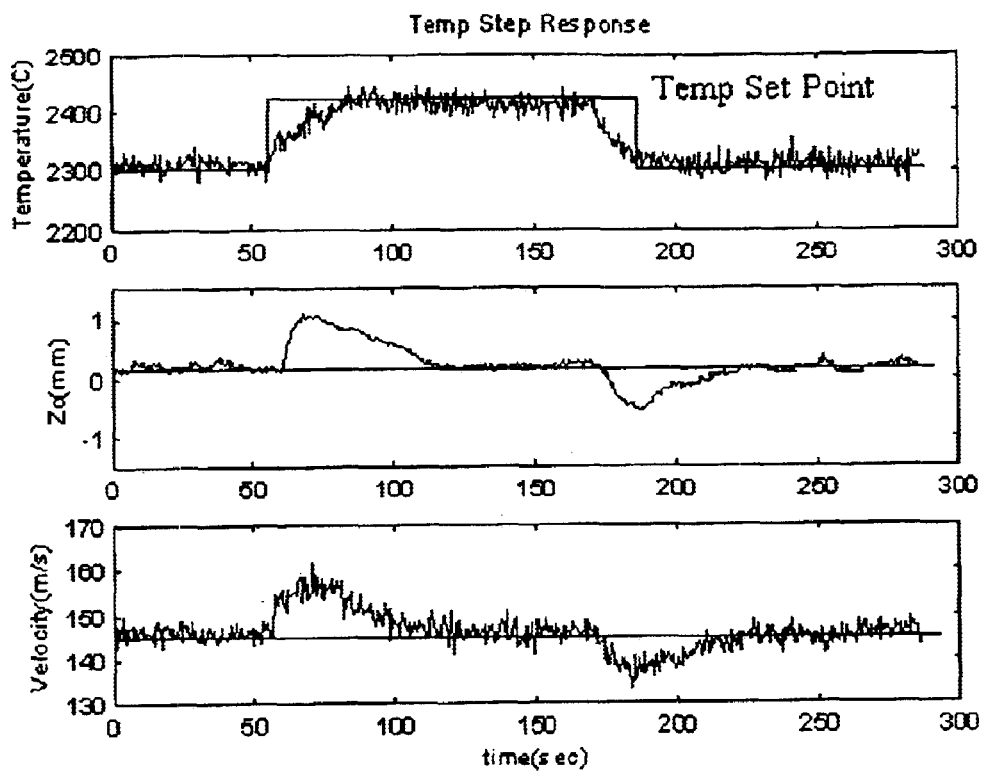
FIGS. 16a, 16b, 16c are test data showing how a sudden change in temperature set point affects temperature, centroid position, and velocity, showing that with the control system of the present invention the system achieves the new temperature set point and restores the previously set centroid position and velocity.
Figure 16D:
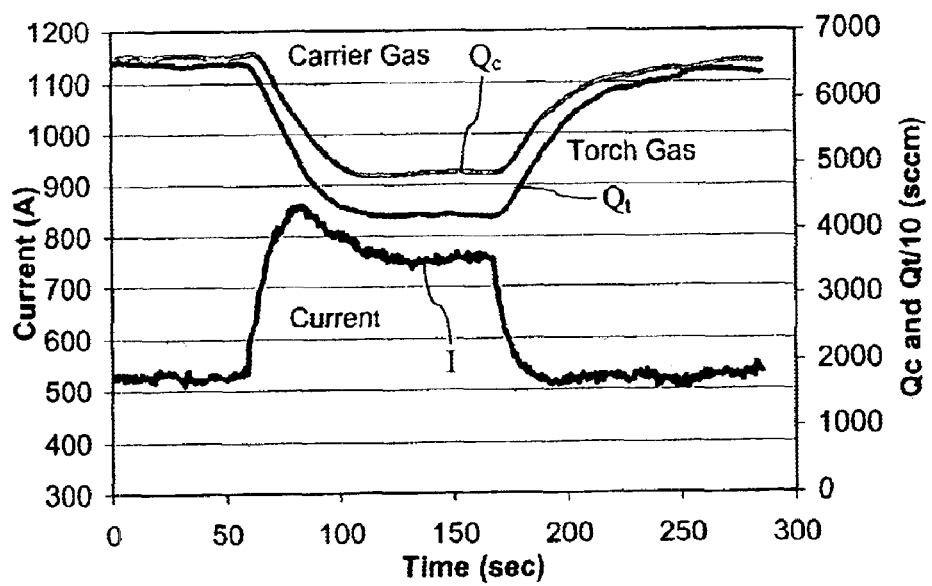
FIG. 16d is test data showing how the sudden change in temperature of FIG. 16a affects current, torch gas flow rate, and carrier gas flow rate.

The complexity that the cross coupling poses is illustrated in the response of the system to a step change in temperature, while measuring particle velocity and centroid position, as shown in FIGS. 16a, 16b, 16c. FIG. 16d shows the complex and coordinated response of the current I, torch gas flow rate Qt, and carrier gas flow rate Qc generated by the controller in response to the change in temperature set point command in FIG. 16a that quickly provides temperature at the new desired set point and restores centroid and velocity to their previous values. The advantage of automatically coordinating changes in all three inputs at the same time is that the time needed to make all the required input changes is minimized and the system makes a robust response to system variations and hysteresis. It is not conceivable that a human operator could make such a complex, quick adjustment that would maintain or restore all three desired outputs in such a quick fashion.

The importance of implementing this control system is that it minimizes the variations in plasma spray deposition conditions to achieve consistent set point control, as shown in FIGS. 16a, 16b, 16c. As a result, one is able to improve the ability to select the deposition conditions that achieve the desired coating structures, such as crack (or delamination) density and orientation, void density, and concentration.

Figure 16E:
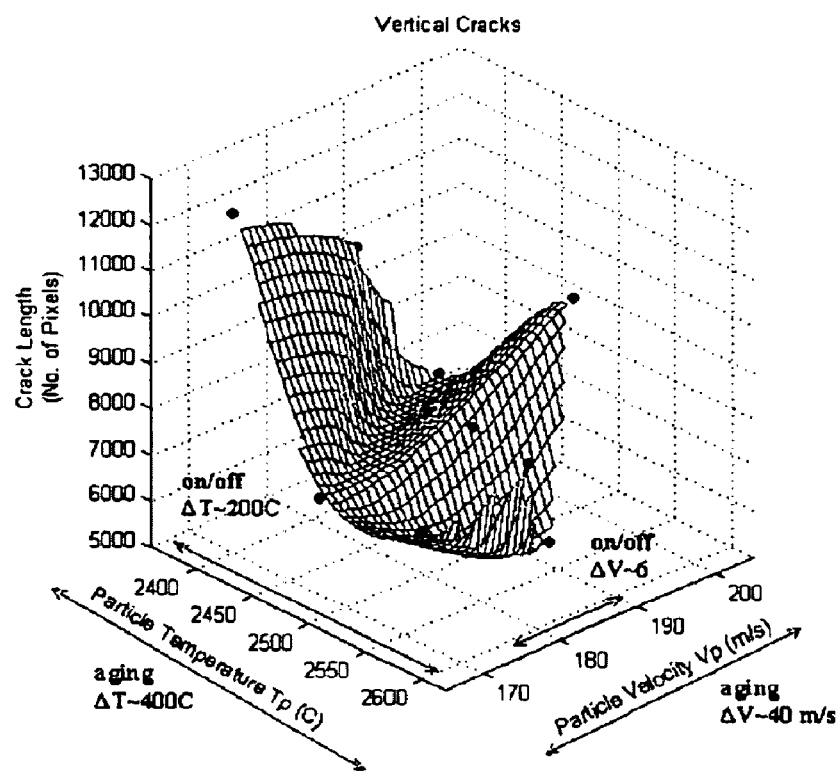
FIG. 16e is test data showing how distribution of total vertical crack length is a function of particle temperature and velocity and how with the control provided with the present invention a desired crack length can be dialed in by setting temperature and velocity setpoints.
Figure 16F:
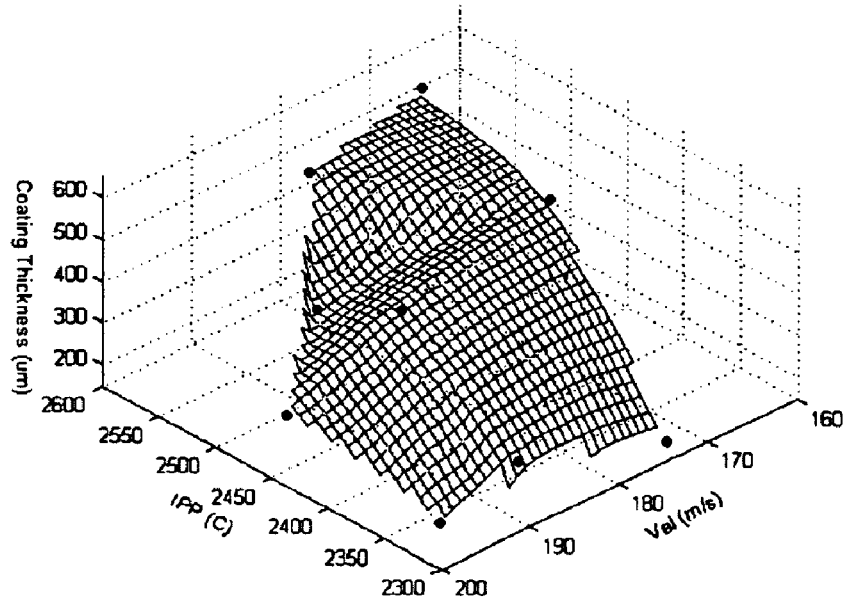
FIG. 16f is test data showing how coating thickness is a function of particle temperature and velocity and how with the control provided with the present invention a desired coating thickness and deposition rate can be dialed in by setting temperature and velocity setpoints.

The present inventors have used the control system to investigate the ability to more tightly engineer crack structure as well as increase the deposition rate. FIG. 16e shows the results of depositing coatings at 9 different conditions of temperature and velocity, holding the centroid position constant where the density of verticle cracks (oriented from 0–45 degress) is plotted. The data shows that the density of cracks can be varied by a factor of 2.2 by varying set point temperature and particle velocity while keeping centroid position fixed. We note that at each point, several test cupons were deposited, and that for each substrate, five different points were analyzed. In all cases, the range of variation indicated in this plot is significantly less then the standard deviation of the data taken for each point. FIG. 16f plots the experimentally determined deposition rate for 9 different deposition conditions of temperature and velocity, where centroid position was held constant. The substantial variation in deposition rate (factor of 5) for these different conditions, indicates the impact of the observed normal variation of particle temperature and velocity that was shown in FIG. 1c can have in terms of inducing coating thickness variations. Here, however, these variations are under control. Thus, by maintaining the desired temperature, velocity, and centroid position to a set point by using the closed loop control system of the present invention, these variations are significantly reduced. In fact they provide the ability to increase deposition rate and the fraction of particles that get deposited, and to more closely control deposition thickness.

The typical variation in temperature and velocity from torch aging and on/off hysteresis (indicated on the plot), would normally obscure the ability to achieve these different variations. By holding temperature and velocity to set points the variability is avoided and the output parameters can be used to control the coating attributes.

Figure 1C:
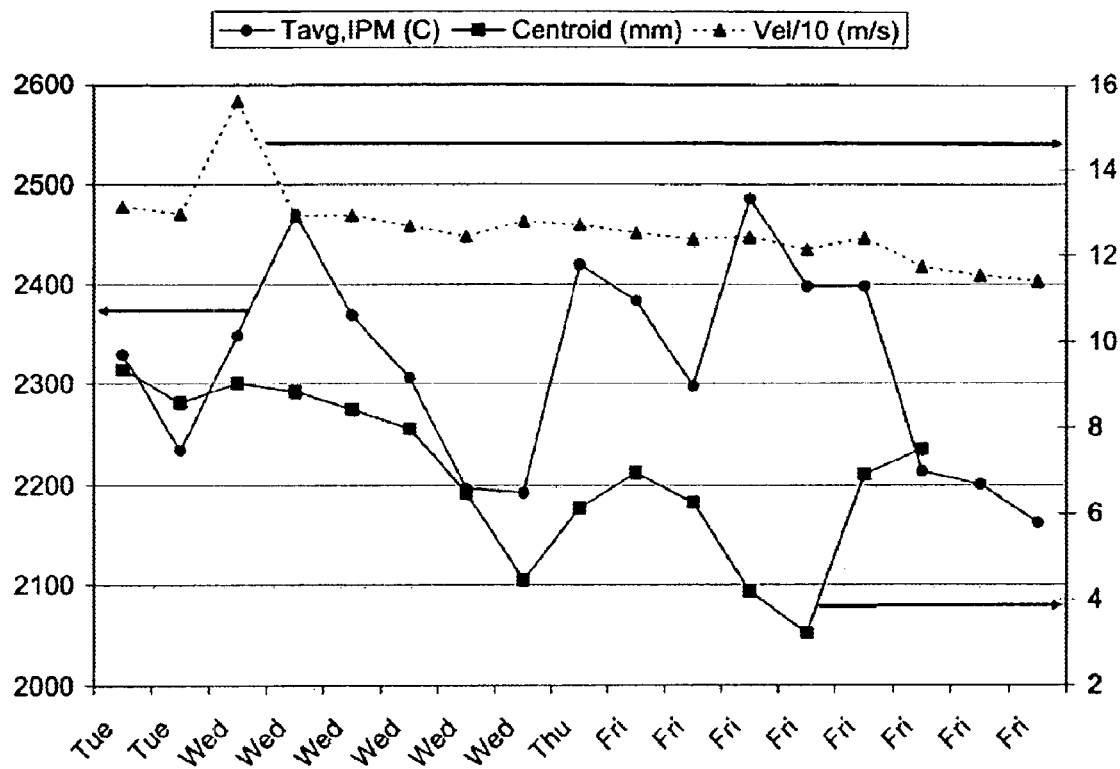
FIG. 1c is test data from a plasma spray system not having the control features of the present invention showing wide variation in plasma spray torch output parameters.
Figure 1D:
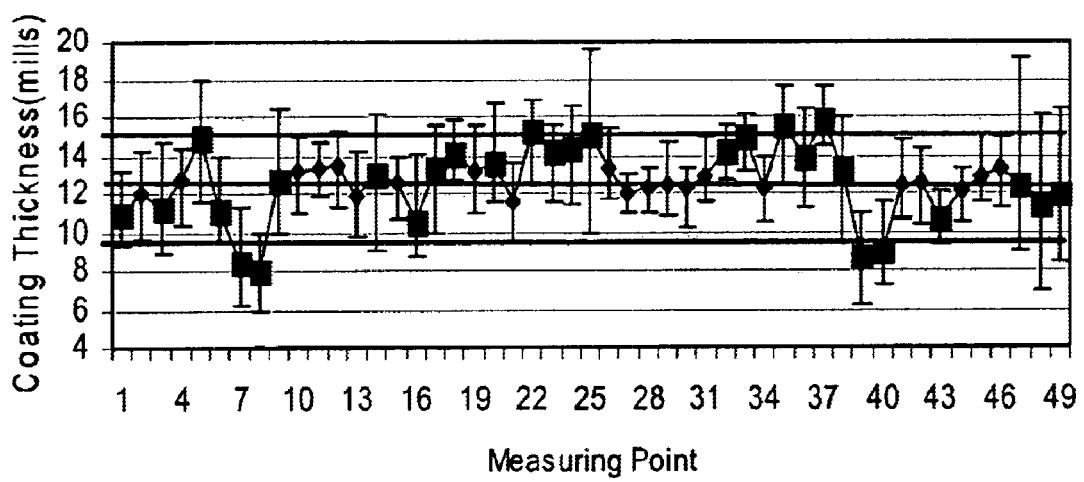
FIG. 1d is additional test data from the experiment of FIG. 1c showing wide variation in coating thickness resulting from the wide variation in plasma spray torch output parameters.

With regard to deposition rate control, FIG. 16f shows the ability to significantly vary the deposition rate under controlled conditions, indicating that the large variations observed in FIG. 1c can be avoided with the process of the present invention.

In some coating applications, it is desirable to manufacture a graded coating, wherein the composition of the coating varies with the coating thickness. In practice, however, the 20–50% variation in coating thickness usually attained without the present invention limited the accuracy of the structure that could be obtained with such graded coatings. However, the closed loop control configurations of this invention result in better regulation of deposition rate, and can be used to achieve tighter production of graded coatings. Thus, the deposition rate control system of FIG. 21a can be used in conjuction with multiple feed sources (including powders, liquids, solutions of powders and liquids, and wires) to coordinate the change in composition with a desired coating thickness. For example, the feed rate of a first material is ramped up over a deposition time period while the feed rate of a second material is ramped down. The closed loop control system is used to maintain overall deposition rate by measuring molten flux rate and spray pattern.

Figure 24:
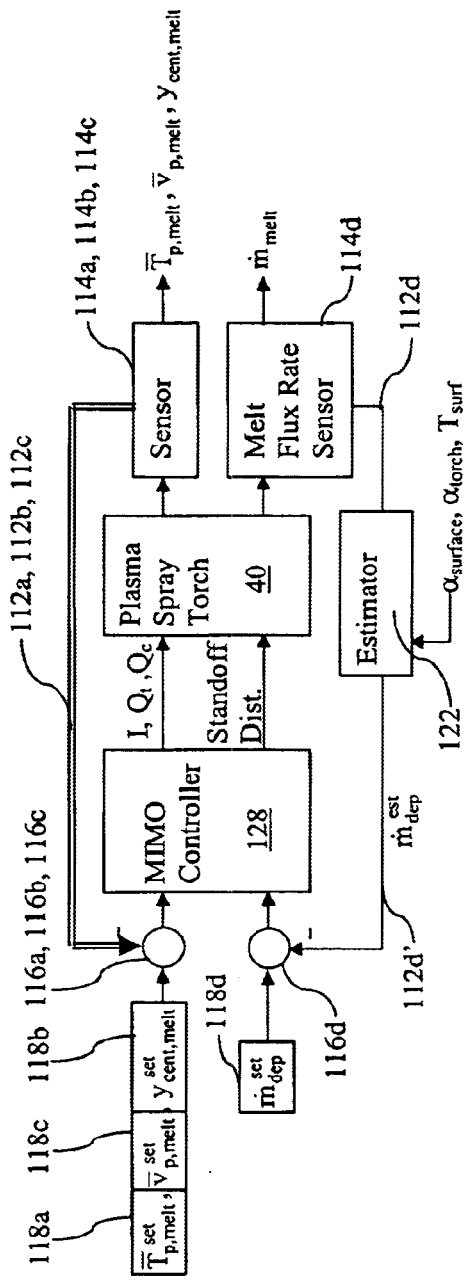
FIG. 24 is a similar to FIG. 23b ut a single MIMO controller is used.

The same coordination between control structure of deposition rate and feeds for providing a graded composition could also be used in FIGS. 23a, 23b, and 24. In addition, control structures like those in FIGS. 21a, 21b, 22a, 22b, 25, 26, and 27 can be used for graded coatings by using powder feeder controller 110d to specify the mass flux rate of all the materials to be deposited. The changing ratio between the different feed materials is set to achieve the desired graded composition as a function of deposited coating thickness.

Figure 18A:
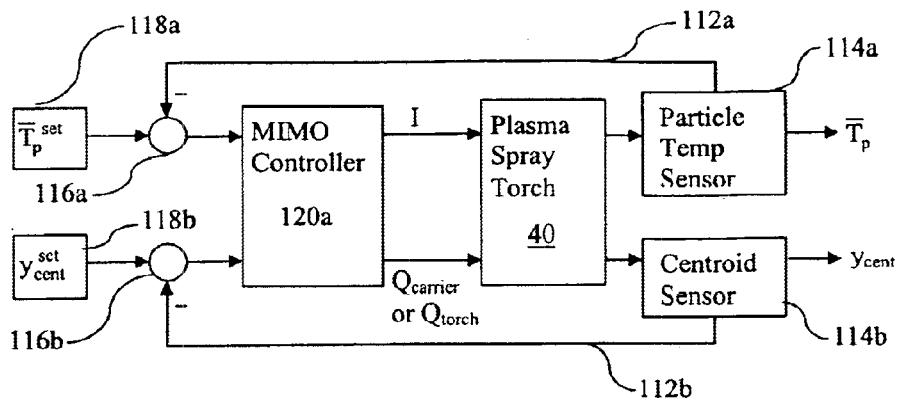
FIG. 18a is a schematic diagram showing a real time control system for maintaining plasma spray spatial distribution with a centroid sensor and an average particle temperature sensor, with a MIMO control structure.

In the control structure of FIG. 17a, each automatic controller 110a, 110b has independent control over one input parameter. Alternatively, a MIMO or decoupler control strategy to minimize the adverse cross coupling affects is shown in FIG. 18a in which single MIMO controller 120a coordinates change in all errors from summing junctions 116a, 116b in one complete control program to control both torch current I and torch gas flow or carrier gas flow. The control program is generated from experiments that determine input/output coupling relationships and then implement those relationships as a computer algorithm.

Figure 18B:
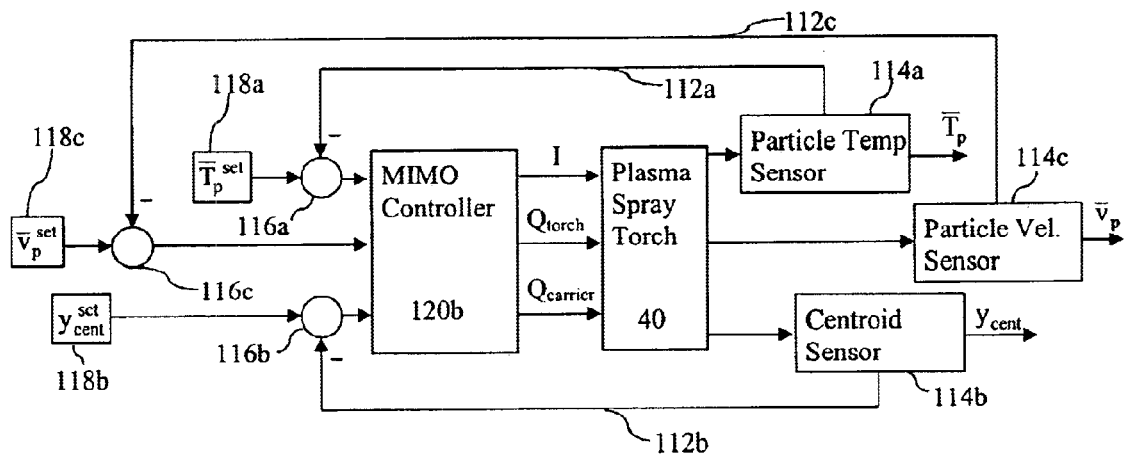
FIG. 18b is a schematic diagram similar to FIG. 17a showing a real time control system for maintaining plasma spray spatial distribution with a centroid sensor, an average particle temperature sensor, and a particle velocity sensor with a MIMO control structure.

A third input and a third output variable can be provided, as shown in FIGS. 17a, 18b. Average particle velocity is measured using sensor 114c, and this data is fed back to summing junction 116c which also takes in preset velocity 118c and provides an error signal to controller 110c to control torch gas flow, while carrier gas flow is controlled by controller 110b. Alternatively, a single MIMO controller 120b coordinates change in all errors from summing junctions 116a, 116b, 116c in one complete control program to control torch current I, torch gas flow, and carrier gas flow, as shown in FIG. 18b.

While these and other output parameters may be measured, the present inventors recognized and demonstrated the importance of controlling the spray pattern or its centroid position, and this output is measured and used for control in all cases. They found three reasons for controlling spray pattern or centroid position in real time.

First, the centroid position reflects the greatest particle flux, which corresponds to the location of the greatest coating thickness. They found enhanced ability to repeatable achieve desired coating thicknesses by controlling based on centroid position. Preferably centroid position is kept in the same position relative to torch and substrate. This centroid position maybe determined by either a position weighted integral of the spatial distribution of the light intensity emitted, where intensity, measured by a CCD camera or diode array, is a function of particle area flux rate and particle temperature, or from an integral of position weighted molten flux ratio.

Second, sensors that measure other particle parameters, such as the individual particle states of particle temperature, velocity, and size may make their measurement in a very small measurement volume. Under these conditions, it is desirable to have that measurement volume in the region of greatest particle flux density to avoid variation that introduced by measuring in different regions of particle distribution 58. The present inventors discovered that the location of this greatest particle flux density changes as the torch ages and/or as torch input variables, such as current and gas flow rates vary, so the measurement location changes as well— unless the torch is properly controlled as provided in the present invention.

Third, the present inventors found that the spray pattern changes because of aging of the torch or as other torch inputs are changed to control the particle states. The spray pattern feedback loop therefore compensates for these variations.

Forth, by keeping the particle flux at the same position relative to the plasma jet along the torch centerline, the ability of the torch inputs to change the particle states and deposition rate is improved.

Controller 110a, 110b, 110c, or 110m provides ability to obtain the same coating characteristics run-to-run and during the life time of the torch electrode, and provides the ability to engineer critical aspects of the coating quality, including coating microstructure, such as crack density and orientation as well as porosity, which determines the coating's performance characteristics.

Figure 19:
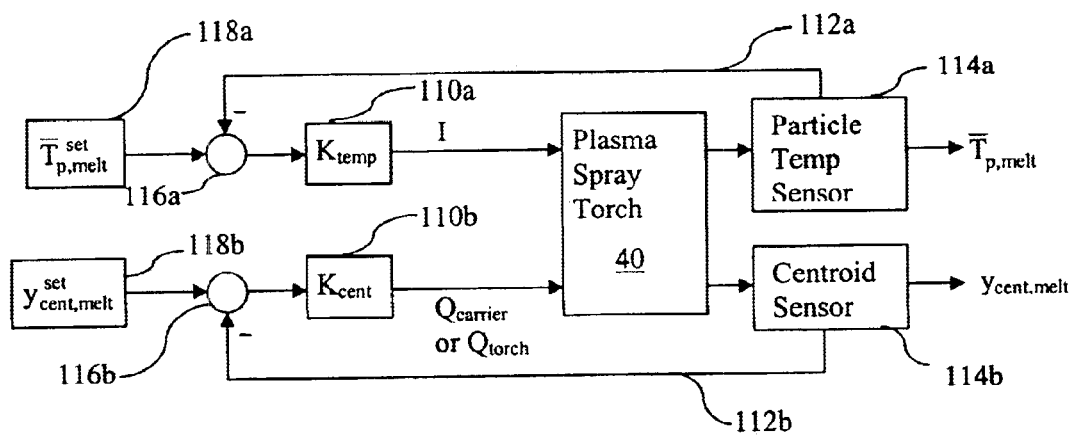
FIG. 19 is a schematic diagram showing a real time control system for maintaining plasma spray molten particle spatial distribution with a molten particle centroid sensor and an average particle temperature sensor, with a decoupled control structure.
Figure 20:
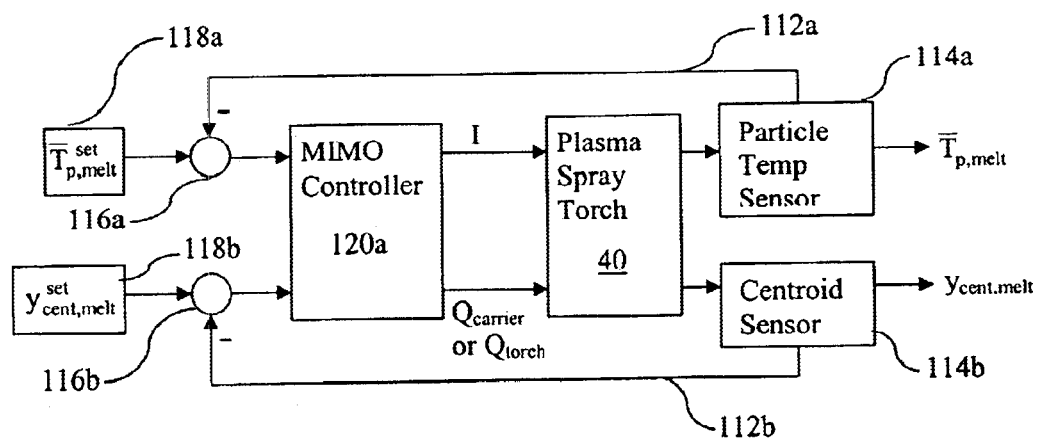
FIG. 20 is a schematic diagram similar to FIG. 17a showing a real time control system for maintaining plasma spray molten particle spatial distribution with a molten particle centroid sensor and an average particle temperature sensor with a MIMO control structure.

The primary particle state control strategy described herein above is based on using average measurements of the particle states. However, in reality, it is not simply the average state of the particle that is important to control and track. Rather, it is more important to control and measure those particles that are incorporated into the coating. In the cases where mostly the molten particles are incorporated in the coating and the unmolten particles bounce off, then it is appropriate to develop the basic feedback structure based on statistics of only those molten particles, as described herein above. In analyzing typical particle temperature data in FIG. 2, it was found that the velocity of the molten particles has the same distribution as the velocity of all the particles. Therefore no separate statistics need be developed for the velocity of molten particles. However, the distribution of temperature for molten particles was significantly different from the distribution for all particles because of the sharp cut off at the melting temperature. Thus, while the same control structure and algorithms are used, the effectiveness of using molten particle states for feedback, as shown in FIGS. 19 and 20, significantly improves control.

One method of tuning the control algorithm is to use an adaptive controller, as described in section 18.4 of the book, *Process Dynamics and Control*, D. E. Seborg, T. F. Edgar, D. A. Mellichamp, Wiley, 1989. A system developed by Leeds and Northrup uses step responses to characterize the system and uses a pre-determined optimized set of PID gains based on the identified system characteristics. A similar self-tuning PID system is available from the Foxboro Company based on an expert system approach.

It is also possible to develop an estimator, wherein the particle state spatial variations can be used to help estimate what the real conditions are for the particle states before the spray pattern position control can be established. The estimator is a numerical algorithm that relates the measured state of molten particle flux, which is then correlated to other important deposition characteristics such as spray angle, part temperature, surface shape, in order to estimate the actual deposition rate on the part surface. For example, the correlation can be expressed in the form of a least squares fit of these variables to the resulting coating thickness obtained from actual deposition experiments conducted off line.

From a production view point it is important that the coating thickness is maintained within specifications run to run and that the deposition rate is maximized without adversely impacting coating quality, that is the ability to consistently meet coating specifications. The present inventors recognized that by measuring and controlling deposition rate, while at the same time controlling the particle state and spray pattern, they could better achieve desired coating thickness while maximizing deposition rate, and improve coating quality.

The present inventors also recognized that control of particle flux rate, including both molten particle flux and unmolten particle flux, can also be important to control coating quality. Molten particle flux affects solidification dynamics as well as deposition rate. Unmolten particle flux affects coating porosity.

Figure 22A:
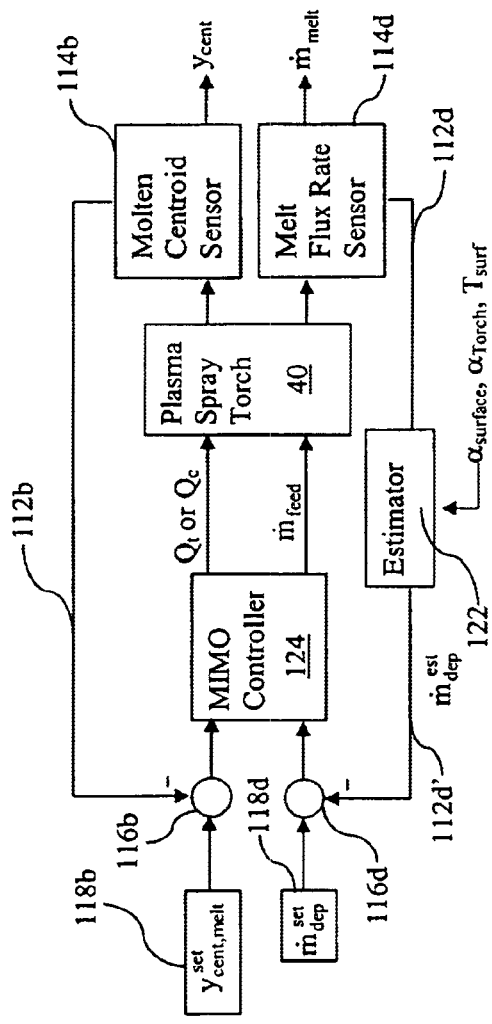
FIG. 22a is a similar to FIG. 21a but a single MIMO controller is used.
Figure 22B:
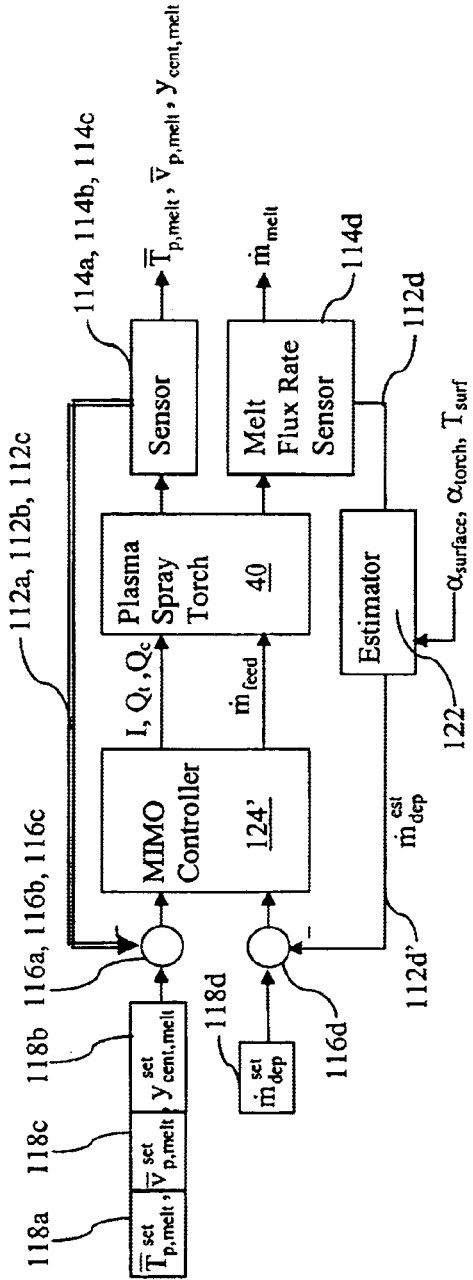
FIG. 22b is a similar to FIG. 21b but a single MIMO controller is used.

In order to control deposition rate, preferably one measures and closes the loop around molten particle flux and spatial distribution, as illustrated in FIGS. 21a and 22a. This molten particle flux rate is measured in real time—while the torch is spraying—by measuring the particle flux rate of those particles above a threshold temperature, such as the melting temperature with molten particle sensor 114d, as shown in FIG. 21a. Molten particle flux maybe determined from the data obtained by the individual particle sensors which provides data on the rate of particles measured, as well as the particle state (temperature, velocity, and diameter). Thus, the mass flux rate of molten particles can be calculated from particles above a threshold temperature (such as the melting temperature), based on the measured diameter and count rate. For each particle, temperature, velocity, and diameter are measured using sensors. To obtain the mass flux, the number of particles is counted and the size of each, from which the mass flux rate is calculated. The same individual particle sensors can be used to count molten particle flux rate by counting only the particles having a temperature above the melting point or another selected temperature representing experimentally found to be associated with deposition. Molten particle flux reading 112d is fed to estimator 122 that calculates estimated deposition rate 112d' from parameters including measured molten particle flux 112d, surface angle, spray angle, and surface temperature. This estimated deposition rate 112d' is subtracted from desired and preset deposition rate setpoint 118d in summing junction 116d. The difference or error in molten particle flux from summing junction 116d is provided to powder feeder controller 110d that adjusts powder feed rate accordingly.

Molten particle flux rate is preferably measured for a consistent portion of the spray pattern, such as at the centroid position. Care in continually measuring at the same consistent position in the spatial distribution is important. The spatial distribution, and its centroid position, shifts as the controller adjusts the input conditions of current, plasma gas flow, and carrier gas flow, and the measurement location or locations should follow the spatial distribution.

At the same time molten particle flux rate is being measured, spatial distribution sensor 114b detects position of the centroid of spatial distribution 58. The centroid position reading is subtracted from desired and preset centroid position setpoint 118b in summing junction 116b. The difference or error in centroid position from summing junction 116a is fed to particle MIMO controller 120c which has an algorithm to adjust torch gas flow or carrier gas flow to torch 40 based on this error signal.

The present inventors found that varying the powder feed rate was the most significant factor in controlling flux rate. Thus, powder feed rate is an appropriate input, as shown in FIGS. 21a and 22a. Alternatively, standoff distance controller 110e to vary standoff distance is provided instead of powder feeder controller 110d, as shown in FIG. 23a to control molten particle flux since the greater the standoff distance, the cooler the particles, decreasing the flux rate of molten particles reaching surface 46. In this case, standoff distance is controlled along with centroid position. Alternatively, standoff distance can be controlled along with temperature, velocity and centroid position, as shown in FIG. 23b. MIMO controller 126 receives error signals from summing junctions 116a, 116b, 116c to adjust current and both gas flows to control all three of these output particle parameters while standoff distance controller 110e varies standoff distance to control flux rate of molten particles striking surface 46. In yet another alternative single MIMO controller 128 can be used to receive all four error signals and provide signals to adjust all four input variables, as shown in FIG. 24.

Figure 15:
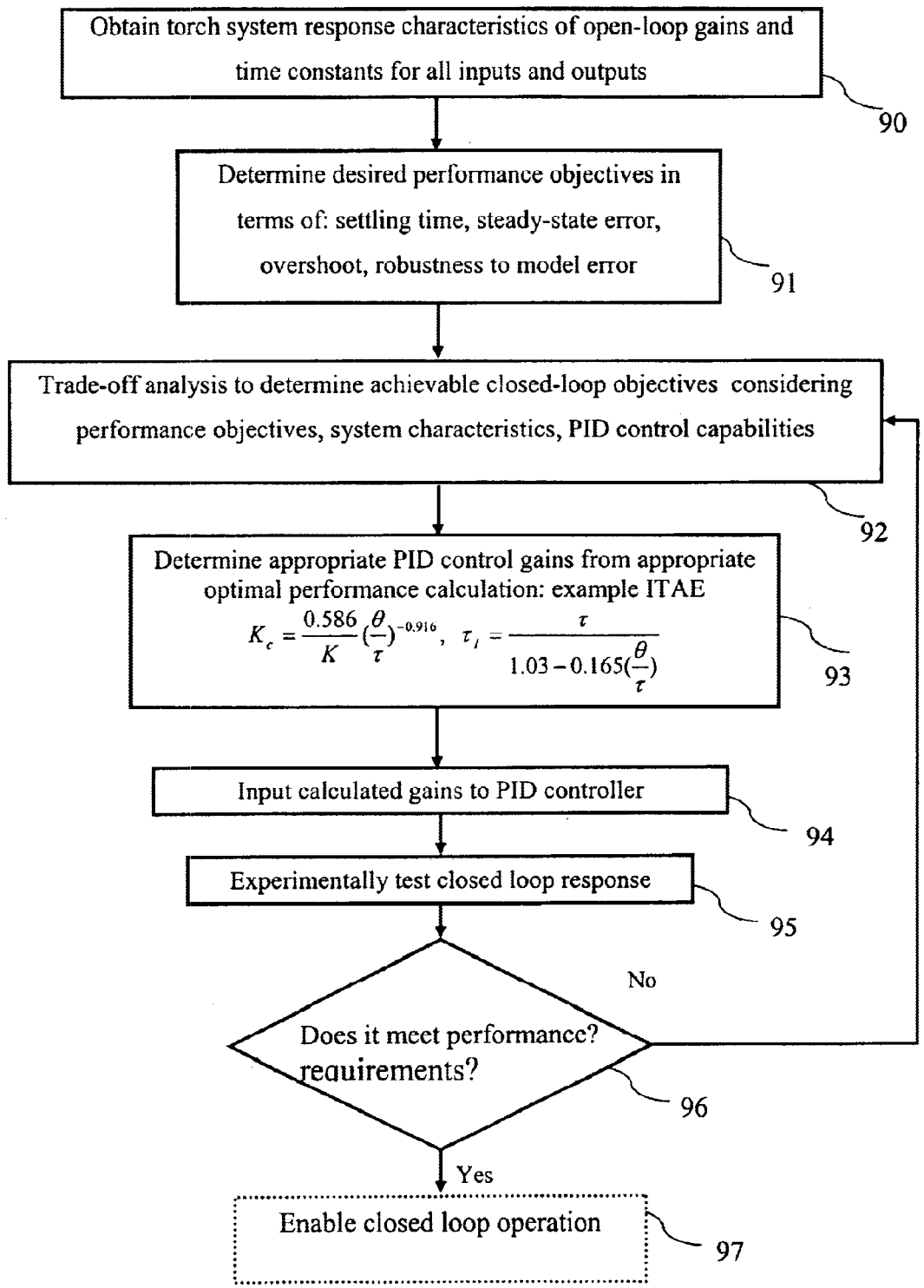
FIG. 15 is a flow chart showing how a controller of the present invention is tuned.

The present inventors found that while increasing the powder feed rate increases the flux of molten particles, the deposition efficiency decreases, as shown in FIGS. 15 and 16. To the extent that the particle flux that is not incorporated into the coating, typically the unmolten particles has no impact on the coating quality, then one would only need to focus on the molten particle flux. However, if the flux of unmolten particles does affect coating quality, then the flux of unmolten particles should also be directly controlled as described herein above.

Since the ratio of the molten to unmolten particles reflects the deposition efficiency, which impacts coating economics, controlling the ratio can help reduce costs. The total economics are determined by the production rate as well as deposition efficiency (which affects per part powder costs). This suggests that the user could develop a cost equation for their production operation, that could be minimized to determine the optimal deposition rate and deposition efficiency, which the closed loop control system would maintain.

The basic control structure described here can be extended to include other factors that are found to affect deposition efficiency such as spray angle, surface curvature, and factors such as substrate temperature, which may impact splashing. Thus, in order to control coating thickness, the information on the varying surface geometry can be included in the deposition rate set point in order to achieve uniform coating thickness for surfaces with varying geometry. Similarly, variations in surface temperature which affect splashing and thus deposition efficiency are also included in the set point trajectory in order to achieve the desired coating thickness. Finally, if unmolten particle fluxes impact coating structure, then unmolten particle flux should be subject to control in a manner similar that described herein above for all particles and for molten particles.

Another way to control the deposition rate is to change the current into the torch, thus changing the fraction of molten particles. Kdep controller 110f or MIMO controller 124 operate from an error signal generated by the difference between deposition rate 112d' and deposition rate set point 118d is used in FIGS. 21c and 22c in conjunction with another control loop that measures the molten centroid position 114b.

Alternatively, a sensor, such as an eddy current or laser interferometer measures coating thickness in real time. Based on the measurement, torch deposition conditions are adjusted on the fly to compensate for measured coating thickness variations. One method is to detect and act on thickness variations as the torch rapidly traverses the part to be coated, such as a turbine blade.

Preferably, the deposition rate controller is coupled to the particle state controller to control both coating thickness and coating quality. Thus, four 4 independent outputs are controlled in real time: deposition rate, particle temperature and velocity, and spray pattern position. There are also 4 inputs to adjust: powder feed rate, current, torch gas flow, and carrier gas flow. Either a decoupled control architecture may be used with 4 independent PID loops, or a centralized MIMO controller can be used, as shown in FIGS. 18a, 18b, 20, 22a, 22b, 24, 26, and 27 to provide the control. Control of deposition rate and control of particle state provide ability to optimize deposition rate without adversely affecting coating quality since the particle state is held constant.

The number of unmolten particles in the deposition process can impact important coating attributes such as porosity. One should also directly control the unmolten particle flux rate 112e relative to the molten particle flux. However, since we are also controlling the particle temperature, in particular the temperature of the molten fraction, one needs an independent input that can be readily manipulated in real-time. Thus, we add the stand-off distance as fifth input, complementing changing the particle feed rate. Increasing the standoff distance allows the particles to cool more, increasing the flux of unmolten particles that strike the substrate surface. Both degrees of freedom are included to control the absolute value of both fluxes independently.

Figure 25:
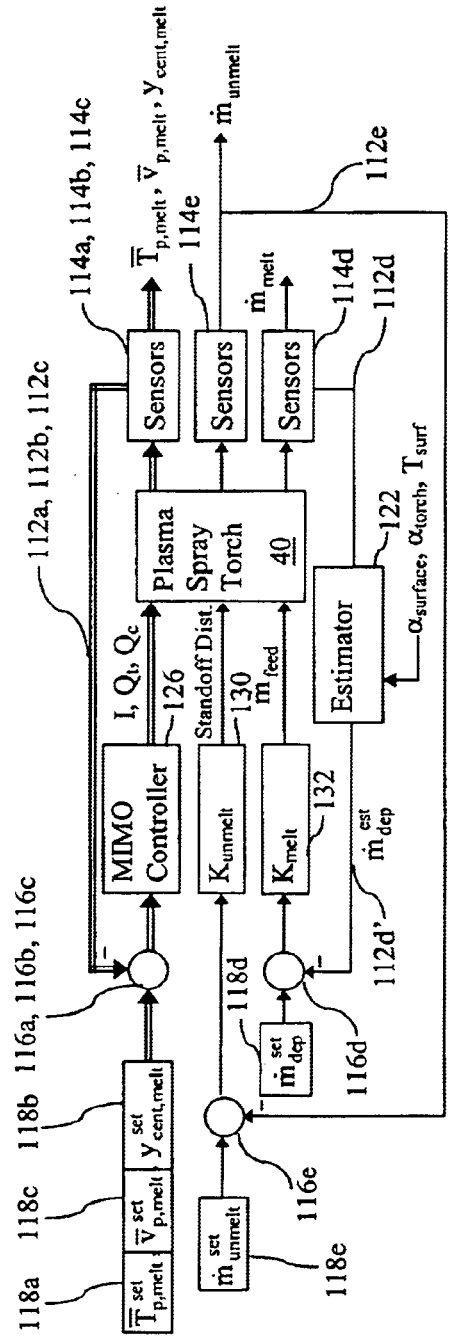
FIG. 25 is similar to FIG. 23b but sensors for both molten and unmolten particles are provided and decoupled controllers are used to adjust both standoff distance and feedrate.
Figure 26:
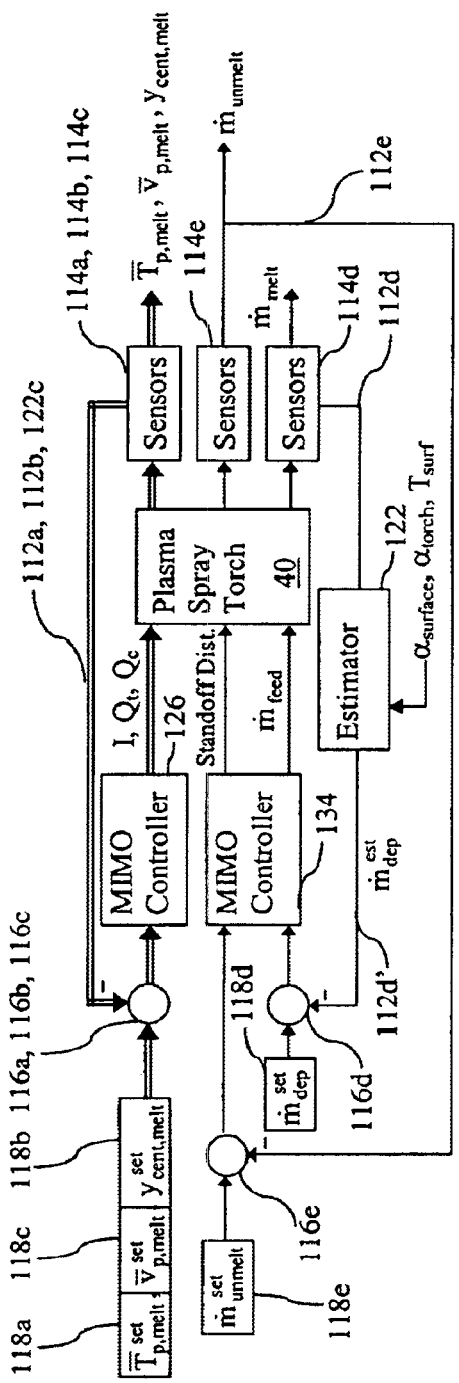
FIG. 26 is a similar to FIG. 25 but a MIMO controller replaces the two decoupled controllers.
Figure 27:
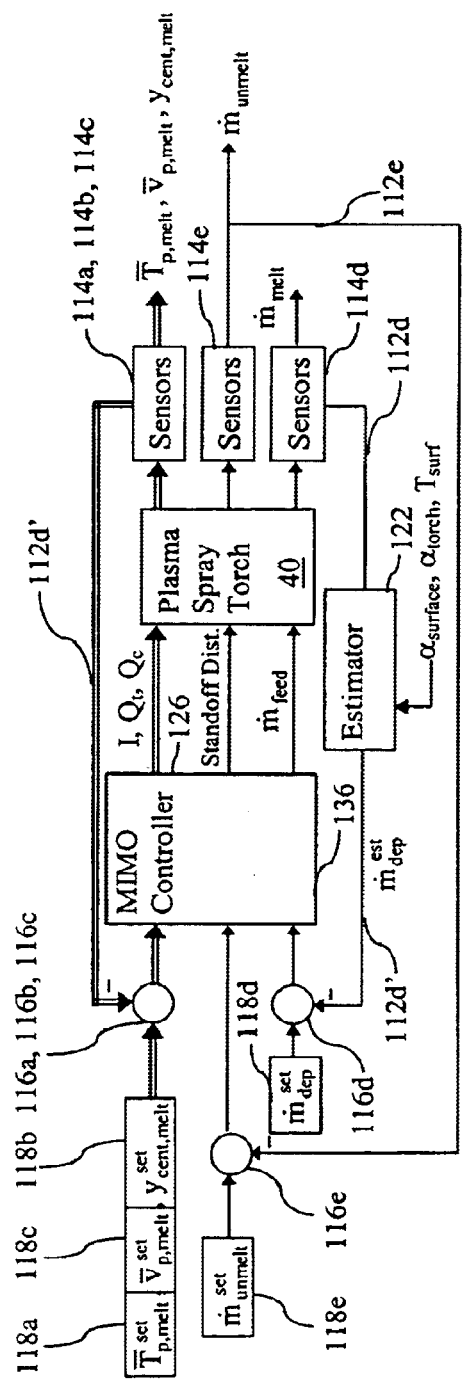
FIG. 27 is a similar to FIG. 26 but a single MIMO controller is used.

Options to take into account the coupling between the inputs, standoff distance, and feedrate and the outputs, molten particle flux rate and unmolten particle flux rate are shown in FIGS. 25, 26, and 27. A decoupled control structure, feeding back the unmolten flux rate to the standoff distance in controller 130 and molten flux rate to the powder feed rate in controller 132 is shown in FIG. 25. This structure can result in reasonable performance since increasing the feed rate impacts both flux rates on an absolute basis, while changing the standoff distance only affects the ratio of the two flux rates.

Improved performance can be obtained using knowledge of the actual input/output coupling to design MIMO control algorithms to explicitly account for the coupling, as shown in FIG. 26 with two MIMO controllers 126 and 134 and FIG. 27 with single MIMO controller 136 for controlling all five parameters.

Figure 28:
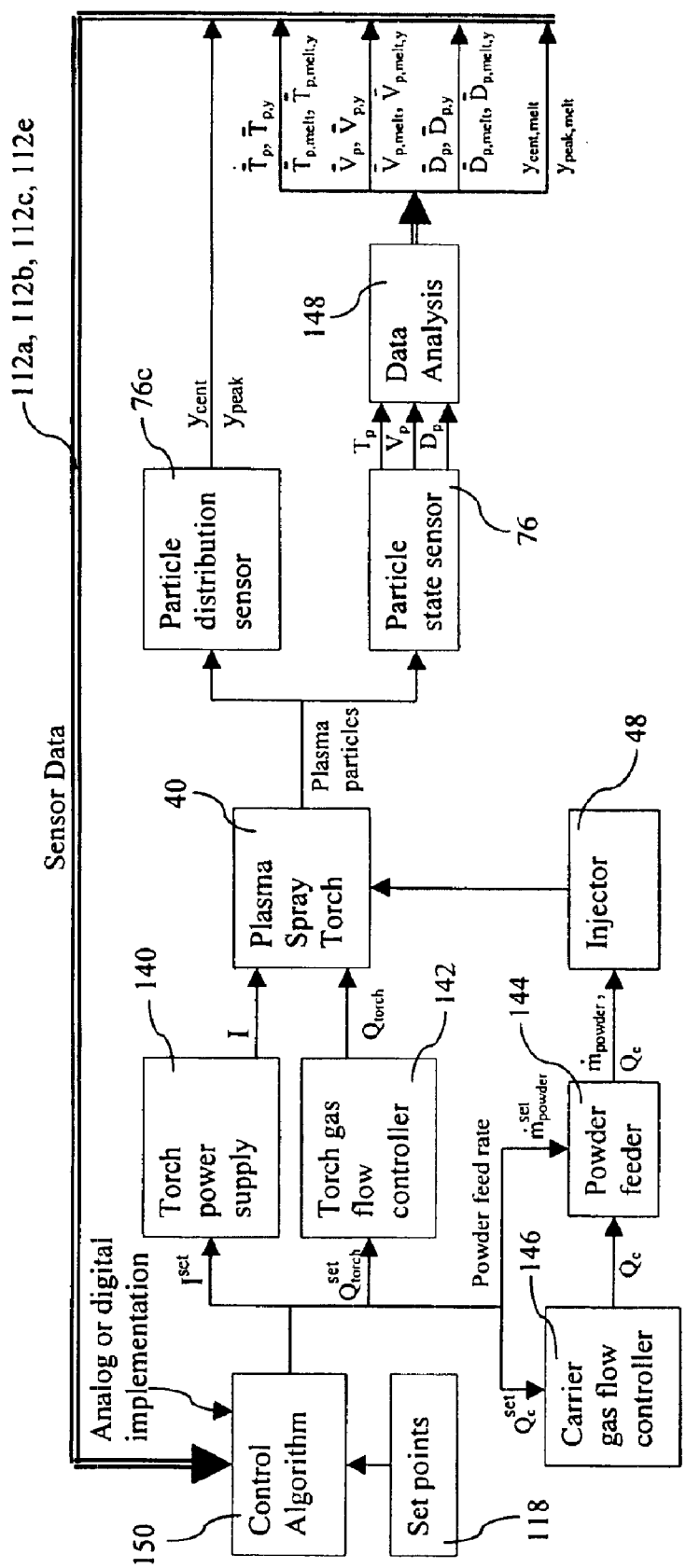
FIG. 28 is a block diagram showing an alternate presentation of the control system of the present invention.

An alternate presentation of a generalized control system is presented in FIG. 28. Torch 40 receives current I from torch power supply 140, torch gas at a flow rate Qt set by torch gas flow controller 142, and powder through injector 48 from powder feeder 144 carried by carrier gas at a flow rate Qc set by carrier gas flow controller 146. Sprayed particles are sensed by particle state sensor 76 that measures temperature, velocity, and diameter of particles or characteristics of the distributions of those parameters. The sensor data is received and analyzed in data analysis system 148. Sprayed particles are also sensed by particle distribution sensor 76c. The various sensor data are provided as feedback to control algorithm 150 in a computer or in an analog circuit. Set points 118 are also provided to this control algorithm. Torch input parameters are adjusted based on difference between the set point and the measured data.

There are other deposition processes such as twin wire arc spray and combustion spraying that would benefit from the present invention in terms of improving coating quality and production objectives through the coordinated control of particle temperature, velocity, and spray pattern. The High Velocity Oxygen Fuel (HVOF) thermal spray coating process involves mixing and burning of oxygen and fuel in a combustion chamber. The hot combustion gases are accelerated to high, often supersonic, velocities through a converging/diverging nozzle. The material to be sprayed is injected into the hot gas steam. The material is accelerated and heated by the combustion gases and is deposited on the substrate part to be coated. A similar principle is used in lower velocity combustion thermal spray process, except the hot combustion gasses are released through a converging nozzle at lower velocities then HVOF. In a twin-wire arc spray process, an electrical arc discharge is established between a pair of electrodes, where at least one electrode is a wire composed of the material to be sprayed. The arc melts the wire made of the material to be sprayed, and a flow of gas through the arc breaks the melted material into droplets while propelling those droplets in the direction of the substrate to be coated. Wire is fed into the arc to maintain a constant arc gap as the end of the wire melts.

With HOVF and low velocity combustion, it has been found that the particle temperature can effectively be changed by varying the fuel to oxygen mixture ratio. This can be done by individually adjusting the fuel and oxygen flow rates. The fuel to oxygen mixture ratio changes affects the temperature of the combustion gasses, thereby affecting the temperature of the particles. By measuring the particle temperature, the fuel and oxygen flow rates can be adjusted so that the particle flux is maintained at the desired temperature. The particle velocity has been found to be a function of combustion chamber pressure. The chamber pressure can be manipulated by changing the total mass flow rate of oxygen and fuel at a given mixture ratio. Thus, one can adjust the total mass flow rate in response to a direct measurement of the chamber pressure, or additionally, in terms of a feedback signal form a measurement of particle velocity.

The spray pattern of the high or low velocity oxygen fuel spray equipment is monitored by a video camera. Coating particles are injected into the hot combustion gas flow by suspending the coating particles in a carrier gas, and directing the flow of carrier gas into the hot combustion gas flow which is similar to the plasma arc spray process. The spray pattern of particles can be controlled by altering the rate of flow of the carrier gas by means of carrier gas controller. Similarly, the control of the mass flux rate can be achieved by varying the powder mass flow rate into the carrier gas by adjusting the particle feeder.

In the twin wire arc process, a power supply provides energy to an arc in a torch. The arc in the torch is established between a pair of wires. A gas flow is established through the arc that will accelerate melted electrode wire material in the form of a spray. Sensors described for the plasma spray process can be used to measure the velocity of the particles as well as their temperature. Thus, the particle temperature can be controlled by adjusting the power to the arc from the power supply in response to variations of particles temperature, while particle velocity can be controlled by adjusting the flow rate of the gas flow through the arc by altering the setting of an arc gas flow controller. The mass flux of the resulting droplets can be measured by the individual particle sensors, and used to determine both the total mass flux rate or the molten flux rate, and used to adjust the wire feed rate, power, and gas flow rates. In addition, the distribution of the wire arc spray pattern, such as its width can be controlled by adjusting the gas flow, power, and wire feed rates. The required control structure (ie whether a decoupled or coupled control structure would work, the required inputs, and input/output pairs) would follow the procedure described for the plasma spray control, FIG. 7.c and 7.d. Thus, first one would determine the input/output gains and the related wire arc system (or HVOF) transfer matrix, scale the matrix, and evaluate the condition number to determine the feasibility of controlling all three degrees of freedom. Next, one would evaluate the RGA array to determine the level of interaction between various loops, and whether a decoupled control structure is practicable. Lastly, one would then determine the specific input output pairs.

Other methods for adjusting the velocity, temperature, and spray pattern of thermal spray equipment may be used. For example, it may be possible to control the temperature of a fuel-oxygen torch type spray equipment by blending a controlled proportion of an inert gas with the oxygen. The temperature of the particles would be a function of the mass flow of oxygen, the mass flow of fuel, and the mass flow of inert gas. Similarly, because the velocity of particles is a function of the velocity of gas flow out of the combustion chamber or through the arc, and the velocity of gas flow is a function of nozzle shape, particle velocity could be controlled through adjustment of an adjustable venture nozzle.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of spraying comprising the steps of:
   a) providing a spray tool having an adjustable input variable;
   b) spraying a feed material with said spray tool to provide a spatial distribution of sprayed particles while they are in flight;
   c) measuring said in flight spatial distribution of sprayed particles or measuring a parameter of said in flight spatial distribution of sprayed particles; and
   d) providing automatic closed loop control over said in flight spatial distribution of sprayed particles, wherein said automatic closed loop control comprises automatically adjusting said input variable to control said in-flight spatial distribution of sprayed particles or to control said parameter of said in flight spatial distribution of sprayed particles.

2. A method as recited in claim 1, wherein said spray tool comprises a plasma spray tool.

3. A method as recited in claim 1, further comprising the steps of:

a) providing a first gas into said plasma spray tool, said first gas having a first gas flow rate;

b) providing a power supply for providing a current across said electrodes for generating a plasma in said first gas;

c) providing said feed material;

d) providing a second gas for carrying said feed material and directing said second gas carrying said feed material into said plasma; and e) heating said feed material in said plasma and accelerating particles of said feed material from said spray torch with said first gas.

4. A method as recited in claim 3, further comprising the steps of measuring velocity, temperature, and spatial distribution of sprayed particles at a specified distance from said spray tool, adjusting said power supply, and adjusting at least one from the group including said first gas flow rate and said second gas flow rate to obtain a preset velocity, temperature, and spatial distribution or a parameter characteristic of said spatial distribution of said particles.

5. A method as recited in claim 1, wherein said spatial distribution of particles consists of particles having a temperature above a specified value or wherein said parameter of said spatial distribution consists of a parameter of spatial distribution of particles having a temperature above a specified value, wherein said adjusting step is based on said measurement of said spatial distribution of particles having a temperature above a specified value or on said parameter of spatial distribution of particles having a temperature above a specified value.

6. A method as recited in claim 5, wherein said specified value of temperature is about equal to melting temperature of said feed material.

7. A method as recited in claim 3, further comprising the step of measuring flux of said particles having a temperature above a specified value at a specified distance from said spray tool or measuring a parameter characteristic of said flux of said particles having a temperature above a specified value at a specified distance from said spray tool.

8. A method as recited in claim 7, further comprising the step of adjusting at least one from the group including said power supply, feed rate of said feed material, and standoff distance, to obtain a desired measurement of said flux of particles having a temperature above said melting temperature at said specified distance from said spray torch.

9. A method as recited in claim 8, further comprising the step of measuring velocity of sprayed particles at a specified distance from said spray tool and adjusting at least one from the group including said power supply, flow rate of said first gas, and flow rate of said second gas to obtain a preset velocity.

10. A method as recited in claim 3, further comprising the step of measuring flux of particles having a temperature below a specified value at a specified distance from said spray tool.

11. A method as recited in claim 10, further comprising the step of adjusting at least one from the group including said power supply, feed rate of said feed material and standoff distance to obtain a preset measurement of flux of particles having a temperature below said specified value at said specified distance from said spray torch.

12. A method as recited in claim 11, further comprising the step of adjusting an input variable to obtain a preset velocity.

13. A method as recited in claim 1, wherein said spray tool has a plurality of said adjustable input variables and said sprayed particles have a plurality of output variables, wherein said closed loop control comprises automatically adjusting said input variables to achieve control over a plurality of said output variables.

14. A method as recited in claim 13, further comprising the steps of measuring input vs output relations, choosing to control an output variable with an input variable that provides substantial gain, and choosing a pairing of output variable measurement data to input variable that provides less interaction than other pairings.

15. A method as recited in claim 13, further comprising the step of providing feedback of output variables measurement data to a controller of input variables, wherein interaction between feedback from multiple sensors measuring output variables does not create system instability.

16. A method as recited in claim 1, wherein said spray tool is part of a deposition system.

17. A method as recited in claim 16, wherein said deposition system comprises a spray deposition system.

18. A method as recited in claim 1, wherein said spray tool has an input variable, wherein said closed loop control comprises automatically adjusting said input variable to achieve a preset spatial distribution or a preset parameter of said spatial distribution.

19. A method as recited in claim 1, wherein said particles comprise powder particles.

20. A method of spraying a feed material as recited in claim 18, wherein said input variable comprises at least one from the group including current, a gas flow rate, a powder feed rate, a wire feed rate, a liquid feed rate, and a suspension feed rate.

21. A method as recited in claim 1, wherein said providing automatic closed loop control step includes using at least one from the group including a processor, control algorithms, and filtering algorithms.

22. A method as recited in claim 1, wherein said measuring step involves taking data only from particles having a preset characteristic or wherein said automatic controller is set to analyze data only for particles having said preset characteristic.

23. A method as recited in claim 22, wherein said preset characteristic comprises temperature.

24. A method as recited in claim 23, wherein said temperature is about equal to melting point of said particles.

25. A method as recited in claim 1, further comprising an actuator, wherein said automatic closed loop control step (c) involves operating said actuator.

26. A method as recited in claim 25, further comprising an automatic controller, wherein said automatic closed loop control step (c) involves using said automatic controller to control said actuator.

27. A method as recited in claim 26, further comprising an input variable that effects said spatial distribution of particles, wherein said actuator adjusts said input variable.

28. A method as recited in claim 27, further comprising providing a second actuator and a second input variable, further comprising the steps of measuring temperature of particles and providing an automatic controller for receiving said temperature measurement and directing said second actuator, said second actuator for adjusting said second input variable as directed by said automatic controller based on said temperature measurement.

29. A method as recited in claim 28, further comprising providing a third actuator and a third input variable, further comprising the steps of measuring velocity of said particles, and providing an automatic controller for receiving said velocity measurement and directing said third actuator, said third actuator for adjusting said third input variable as directed by said automatic controller based on said velocity measurement.

30. A method as recited in claim 1, further comprising the step of measuring flux of particles having a temperature above a specified value at a specified distance from said spray tool.

31. A method as recited in claim 30, further comprising the steps of providing a power supply, gas flow, and a substrate to be coated, wherein said substrate is located at a standoff distance from said spray tool, wherein said automatic closed loop control step further includes the step of providing an automatic controller for adjusting at least one from the group including feed rate of feed material, said power supply, said gas flow rate, and said standoff distance to obtain a preset measurement of flux of particles having a temperature above said specified value at said standoff distance from said spray tool.

32. A method as recited in claim 31, further comprising an automatic controller for obtaining a preset velocity.

33. A method as recited in claim 1, wherein said spatial distribution of particles has a densest portion, further comprising the step of measuring data from a plurality of positions within said spatial distribution to automatically locate and receive data from said densest portion, wherein said controller is set to control said actuator based solely on said data from said densest portion.

34. A method as recited in claim 33, wherein said densest portion comprises a centroid of said spatial distribution.

35. A method as recited in claim 33, wherein said densest portion comprises a peak of said spatial distribution.

36. A method as recited in claim 1, wherein said measuring said spatial distribution step (b) comprises using a camera for detecting location of highest intensity optical emission.

37. A method as recited in claim 1, wherein said parameter comprises centroid position.

38. A method as recited in claim 1, wherein said parameter comprises peak of said in flight spatial distribution position or width of said in flight spatial distribution.

39. A method as recited in claim 1, further comprising the step of measuring temperature or velocity of sprayed particles and providing automatic closed loop control over said temperature or velocity of sprayed particles.

40. A method as recited in claim 1, further comprising the step of measuring temperature and velocity of sprayed particles and providing automatic closed loop control over said temperature and said velocity of sprayed particles.

41. A method as recited in claim 1, further comprising the step of spraying a production part, wherein said spraying, measuring, and providing closed loop control steps are provided at a separate location from the step of spraying the production part.

42. A method as recited in claim 3, further comprising the step of providing a second feed material and adjusting feed rates of said feed material and said second feed material to provide a graded composition.

43. A method as recited in claim 4, further comprising the steps of measuring a relationship between input variables and output variables choosing to control an output variable by varying an input variable that provides substantial gain, and choosing a pairing of an output variable to an input variable that provides less interaction than other pairings.

44. A method as recited in claim 7, wherein said parameter characteristic of mass flux comprises light intensity.

45. A method as recited in claim 1, wherein said measuring step (b) comprises the step of using a camera for detecting a spatial distribution of optical emission intensity.

46. A method as recited in claim 25, wherein said automatic controller controls based only on a measurement of particles having a temperature above a specified temperature.

47. A method as recited in claim 46, wherein said specified temperature is about equal to melting temperature of said particles.

48. A method as recited in claim 25, wherein said automatic controller controls based only on velocity measurement of particles having a temperature above a specified temperature.

49. A method as recited in claim 1, wherein said spray tool comprises a plasma spray torch having electrodes.

50. A method as recited in claim 3, wherein said automatic closed loop control includes one or more of the steps of adjusting said first gas flow rate and adjusting said second gas flow rate to obtain said preset spatial distribution or a preset parameter characteristic of said spatial distribution of said particles.

51. A method as recited in claim 3, further comprising the step of measuring a temperature of said particles or measuring a parameter characteristic of said temperature of said particles.

52. A method as recited in claim 51, wherein said automatic closed loop control includes the step of adjusting said controllable power supply to achieve a desired temperature of said particles or a desired parameter characteristic of said temperature of said particles.

53. A method as recited in claim 3, further comprising the step of adjusting rate of providing said feed material by adjusting at least one from the group including a powder feed rate, a wire feed rate, a liquid feed rate, and a suspension feed rate.

54. A method as recited in claim 27, wherein said automatic closed loop control step (c) further involves providing data related to said spatial distribution to said automatic controller.

55. A method as recited in claim 51, wherein said parameter characteristic of temperature comprises light intensity.

56. A method of spraying comprising the steps of:
a) providing a spray tool having an adjustable input variable;
b) spraying a feed material with said spray tool to provide sprayed particles in flight;
c) selecting at least one from the group of output variables spatial distribution of said sprayed particles that are in flight, and a parameter of said spatial distribution of said sprayed particles that are in flight;
d) setting a set point of each selected output variable; and e) measuring each selected output variable;

f) providing automatic closed loop control over each selected output variable wherein said automatic closed loop control comprises automatically adjusting said input variable to control said selected output variable to achieve said set point.

57. A method of spraying a material as recited in claim 56, wherein said step (e) further comprises measuring at least one from a second group including light intensity, temperature and velocity, wherein said step (f) further comprises the step of providing automatic closed loop control over at least one from said second group, and wherein said step (d) further comprises setting a set point of at least one from said second group to achieve said desired coating characteristic.

58. A method of spraying a coating as recited in claim 56, wherein said step (c) comprises selecting a plurality of output variables and said step (d) comprises setting set points of each of said plurality of output variables to achieve a desired coating porosity.

59. A method of spraying a coating as recited in claim 56, comprising setting said point to achieve at least one from the group including a desired coating porosity and a desired coating crack density.

60. A method of spraying a coating as recited in claim 56, comprising setting said point to achieve a desired coating thickness.

\* \* \* \* \*